United States Patent
Taniguchi et al.

(10) Patent No.: US 10,895,869 B2
(45) Date of Patent: Jan. 19, 2021

(54) RAW MATERIAL SUPPLY DEVICE, RAW MATERIAL SUPPLY METHOD, AND SHEET MANUFACTURING APPARATUS

(71) Applicant: SEIKO EPSON CORPORATION, Tokyo (JP)

(72) Inventors: Seiichi Taniguchi, Nagano (JP); Yoshinobu Monbetsu, Nagano (JP); Kaneo Yoda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 16/089,417

(22) PCT Filed: Mar. 29, 2017

(86) PCT No.: PCT/JP2017/012868
§ 371 (c)(1),
(2) Date: Sep. 28, 2018

(87) PCT Pub. No.: WO2017/170672
PCT Pub. Date: Oct. 5, 2017

(65) Prior Publication Data
US 2019/0121330 A1    Apr. 25, 2019

(30) Foreign Application Priority Data

Mar. 31, 2016  (JP) .................................. 2016-070422

(51) Int. Cl.
*D21H 11/14*     (2006.01)
*D21G 9/00*      (2006.01)
(Continued)

(52) U.S. Cl.
CPC ......... *G05B 19/41865* (2013.01); *B65H 3/44* (2013.01); *D21B 1/00* (2013.01); *D21B 1/10* (2013.01); *D21G 9/0054* (2013.01); *D21H 11/14* (2013.01); *D21H 23/78* (2013.01); *G05B 19/418* (2013.01); *G05B 2219/31376* (2013.01); *Y02P 90/02* (2015.11)

(58) Field of Classification Search
CPC .......... D21B 1/066; D21B 1/068; D21B 1/08; D21B 1/10; D21G 9/0009; D21G 9/0018; D21G 9/0054; D21H 11/14; D21H 23/78; G05B 19/41865; B65H 3/44; B65H 3/443; B65H 3/446
USPC ............ 162/4, 198, 252, 253, 259, 262, 263
See application file for complete search history.

(56) References Cited

U.S. PATENT DOCUMENTS 10,472,766 B2 * 11/2019 Murayama ............. D01G 13/00
2017/0260691 A1    9/2017 Murayama et al.

FOREIGN PATENT DOCUMENTS

JP     02-163232 A     6/1990
JP     2011-157657 A    8/2011
(Continued)

*Primary Examiner* — Eric Hug
(74) *Attorney, Agent, or Firm* — Global IP Counselors, LLP

(57) ABSTRACT

A raw material supply device includes a plurality of supply portions for supplying the raw material, a detection portion for detecting a state of the supply portion, and a control portion for controlling the supply portion, in which when the plurality of supply portions are in a normal state, the control portion switches the supply portions at a predetermined timing, and causes each of the supply portions to supply the raw material.

8 Claims, 13 Drawing Sheets

(51) Int. Cl.
*B65H 3/44* (2006.01)
*G05B 19/418* (2006.01)
*D21H 23/78* (2006.01)
*D21B 1/10* (2006.01)
*D21B 1/00* (2006.01)

(56) References Cited

FOREIGN PATENT DOCUMENTS

| WO | 2016/035313 A1 | 3/2016 | |
| WO | WO 2016/035313 | * 3/2016 | ............... D21B 1/08 |

* cited by examiner

FIG. 10

| FIRST SUPPLY PORTION | PLEASE SELECT PRIORITY OF FIRST SUPPLY PORTION |
| --- | --- |
| | FIRST  SECOND  THIRD |

| SECOND SUPPLY PORTION | PLEASE SELECT PRIORITY OF SECOND SUPPLY PORTION |
| --- | --- |
| | FIRST  SECOND  THIRD |

| THIRD SUPPLY PORTION | PLEASE SELECT PRIORITY OF THIRD SUPPLY PORTION |
| --- | --- |
| | FIRST  SECOND  THIRD |

FIG. 11

| FIRST SET: FIRST SUPPLY PORTION | PLEASE SET OPERATION RATE. |
| --- | --- |
| | 50% |

| SECOND SET: SECOND SUPPLY PORTION | PLEASE SET OPERATION RATE. |
| --- | --- |
| | 50% |

| THIRD SET: THIRD SUPPLY PORTION | PLEASE SET OPERATION RATE. |
| --- | --- |
| | 50% |

RAW MATERIAL SUPPLY DEVICE, RAW MATERIAL SUPPLY METHOD, AND SHEET MANUFACTURING APPARATUS

CROSS-REFERENCE TO RELATED APPLICATIONS

This application is a U.S. National stage application of International Patent Application No. PCT/JP2017/012868, filed on Mar. 29, 2017, which claims priority under 35 U.S.C. § 119(a) to Japanese Patent Application No. 2016-070422, filed in Japan on Mar. 31, 2016. The entire disclosure of Japanese Patent Application No. 2016-070422 is hereby incorporated herein by reference.

TECHNICAL FIELD

The present invention relates to a raw material supply device, a raw material supply method, and a sheet manufacturing apparatus.

BACKGROUND ART

In general, there is known a waste paper processing apparatus that switches to another regular paper tank and continues operation in a case where one regular paper tank is unable to supply (for example, refer to Japanese Unexamined Patent Application Publication No. 2011-157657).

However, in the above apparatus, since it is not switched to another regular paper tank until one regular paper tank is unable to supply, a raw material stored in another regular paper tank remain stored for a period until an operation switches. Therefore, when the raw material was left for a long period of time, there was a problem that the raw material deteriorated (for example, occurrence of mold in a sheet-like raw material containing cellulose). In addition, in a case where confidential information was included in the raw material, there was a problem that the risk of leakage of secrets increased as the period of leaving the raw material was longer.

SUMMARY

The present invention has been made to solve at least a portion of the above-described problems, and can be realized as the following aspects or application examples.

Application Example 1

A raw material supply device according to this application example includes a plurality of supply portions for supplying a raw material, a detection portion for detecting a state of the supply portion, and a control portion for controlling the supply portion, in which when the plurality of supply portions are in a normal state, the control portion switches the supply portions at a predetermined timing, and causes each of the supply portions to supply the raw material.

According to this configuration, since the raw materials are alternately supplied from the plurality of supply portions, it is possible to prevent the raw materials stored in a certain supply portion from being left for a long time. In addition, it is possible to prevent deterioration of raw materials caused by leaving for a long time. Furthermore, by supplying the raw materials sequentially from a plurality of supply portions, the unbalance of operation is reduced and the state of each supply portion can be kept satisfactory.

Application Example 2

When any of the supply portions is in an abnormal state, the control portion of the raw material supply device according to the application example causes another supply portion in the normal state to supply the raw material.

According to this configuration, even when a certain supply portion is in the abnormal state (raw material is unable to supply), the raw material is supplied from another supply portion. As a result, the supply of the raw material can be continued without interruption.

Application Example 3

The control portion of the raw material supply device according to the application example controls the supply portion so that a supply amount of the raw material per unit time when the plurality of supply portions are in the normal state and a supply amount of the raw material per unit time when any of the supply portions is in the abnormal state are the same as each other.

According to this configuration, even when a certain supply portion is in the abnormal state, the supply amount to be supplied by the supply portion in the abnormal state is supplemented in another supply portion in the normal state. Therefore, the supply amount of the raw material becomes constant, and the influence on the subsequent step can be inhibited.

Application Example 4

In the raw material supply device according to the application example, a notification portion that notifies the state of the supply portion.

According to this configuration, the user can grasp the state of each supply portion, for example, it is possible to cope with the maintenance and the like of the supply portion in the abnormal state.

Application Example 5

In the raw material supply device according to the application example, the supply portion includes a first supply portion and a second supply portion, and the control portion operates the first supply portion at a first operation rate and operates the second supply portion at a second operation rate different from the first operation rate.

According to this configuration, it is possible to operate (raw material supply) at an appropriate operation rate according to the specification of each supply portion and the type of raw material stored in each supply portion.

Application Example 6

The raw material supply device according to the application example further includes a setting portion that sets the operation rate of the supply portion.

According to this configuration, it is possible to set an appropriate operation rate according to the specification of each supply portion and the type of raw material stored in each supply portion. Furthermore, in a case where different raw material is supplied from each supply portion, a mixing ratio of the raw materials can be freely set.

Application Example 7

In the raw material supply device according to the application example, the supply portion includes at least three or more supply portions, and the control portion selects at least two or more supply portions of the plurality of supply portions according to a preset priority, and causes each of the selected supply portions to supply the raw material.

According to this configuration, by operating three or more supply portions, it is possible to more stably supply the raw material.

Application Example 8

A raw material supply method of a raw material supply device according to the application example, which includes a plurality of supply portions for supplying a raw material, the method includes switching the supply portions at a predetermined timing, and causing each of the supply portions to supply the raw material when the plurality of supply portions are in a normal state.

According to this configuration, since the raw materials are alternately supplied from the plurality of supply portions, it is possible to prevent the raw materials stored in a certain supply portion from being left for a long time. In addition, it is possible to prevent deterioration of raw materials caused by leaving for a long time. Furthermore, by supplying the raw materials sequentially from a plurality of supply portions, the unbalance of operation is reduced and the state of each supply portion can be kept satisfactory.

Application Example 9

A sheet manufacturing apparatus according to the application example includes the raw material supply device.

According to this configuration, the raw material is stably supplied from the raw material supply device, and the sheet can be produced efficiently.

BRIEF DESCRIPTION OF DRAWINGS

FIG. 10 is an explanatory diagram illustrating a display example in an input and output portion according to the second embodiment.

FIG. 11 is an explanatory diagram illustrating a display example in the input and output portion according to the second embodiment.

DESCRIPTION OF EMBODIMENTS

Hereinafter, first and second embodiments of the present invention will be described with reference to the drawings. In the following drawings, a scale of each member and the like is illustrated different from an actual scale so as to make each member and the like to be recognizable size.

First Embodiment

Figure 1:
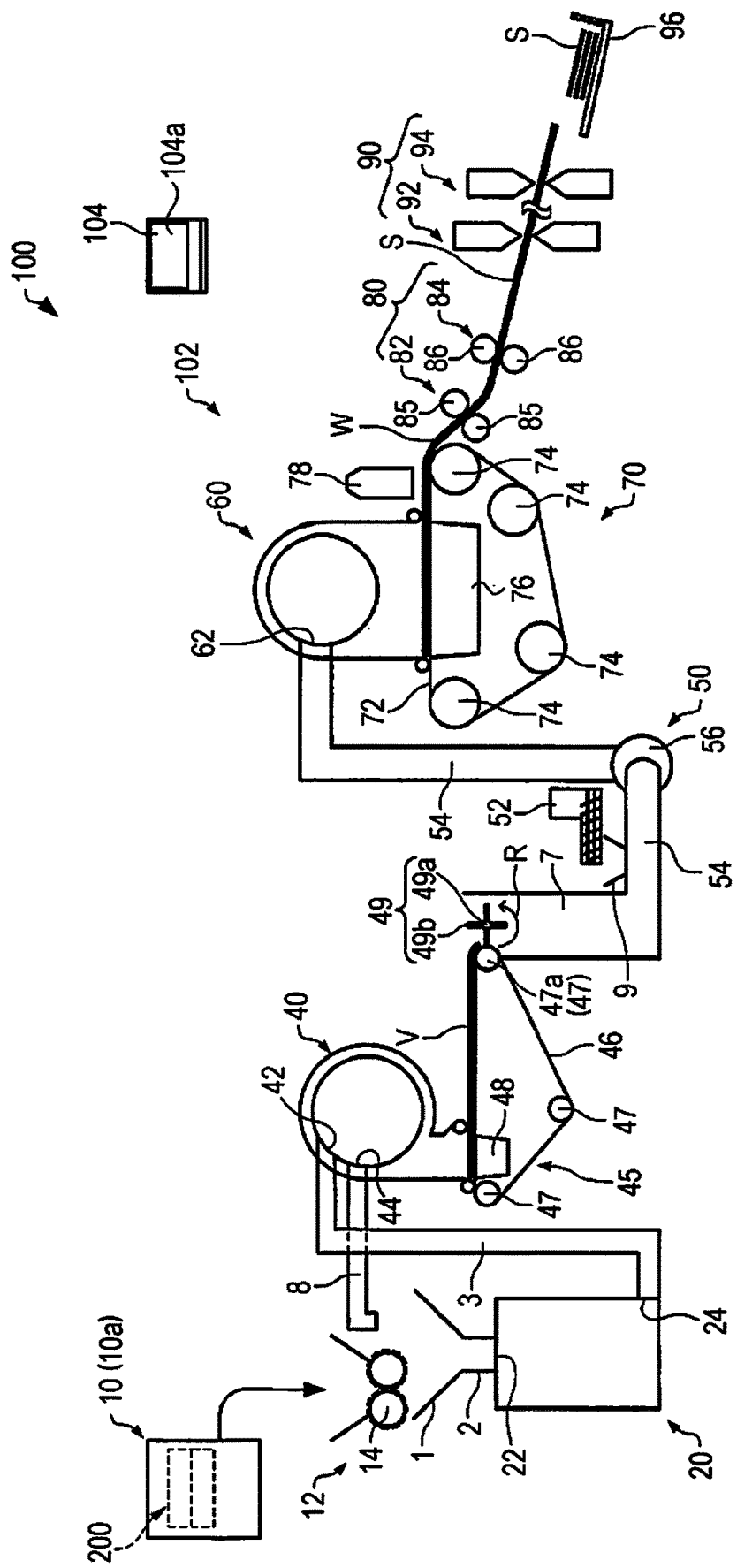
FIG. 1 is a schematic diagram illustrating a configuration of a sheet manufacturing apparatus according to a first embodiment.

First, a sheet manufacturing apparatus will be described with reference to the drawings. FIG. 1 is a schematic diagram illustrating a configuration of the sheet manufacturing apparatus according to the present embodiment.

As illustrated in FIG. 1, a sheet manufacturing apparatus 100 is provided with a raw material supply device 10, a manufacturing portion 102, and a control portion 104. The manufacturing portion 102 manufactures a sheet. The manufacturing portion 102 includes a coarse crushing portion 12, a defibrating portion 20, a sorting portion 40, a first web forming portion 45, a rotating object 49, a mixing portion 50, an accumulation portion 60, a second web forming portion 70, a sheet forming portion 80, and a cutting portion 90.

The raw material supply device 10 includes a supply portion 200 for supplying a raw material. The raw material supplied by the raw material supply device 10 contains a fiber structure such as a waste paper and a pulp sheet, for example. In the present embodiment, the raw material supply device 10 is a device for supplying the raw material to the coarse crushing portion 12, and has a configuration capable of continuously introducing the raw material. Details of the raw material supply device 10 will be described later. The raw material supply device may be a device for supplying paper pieces crushed by the coarse crushing portion as a raw material.

The coarse crushing portion 12 cuts the raw material supplied by the raw material supply device 10 into a strip in the air such as atmosphere (in air). The shape and size of the strip is, for example, a strip of several cm square. In the illustrated example, the coarse crushing portion 12 includes a coarse crushing blade 14, and the coarse crushing blade 14 can cut the raw material charged. As the coarse crushing portion 12, for example, a shredder is used. The raw material cut by the coarse crushing portion 12 is transferred (transported) to the defibrating portion 20 after being received by a hopper 1 via a pipe 2.

The defibrating portion 20 defibrates the raw material cut by the coarse crushing portion 12. Here, "to defibrate" means to unravel the raw material (material to be defibrated) formed by binding a plurality of fibers to each fiber one by one. The defibrating portion 20 also has a function of separating substances such as resin material, ink, toner, bleed inhibitor and the like attached to the raw material from the fiber.

Material which passed through the defibrating portion 20 is referred to as "defibrated material". The "defibrated material" may contain resin (resin for bonding a plurality of fibers) material separated from fibers when unraveling fibers, coloring agents such as ink and toner, or additives such as bleed inhibitor and paper strength enhancer in addition to unraveling defibrated fibers. The shape of unraveled defibrated material is a string or ribbon shape. The unraveled defibrated material may exist in a state not intertwined with other unraveled fiber (independent state), or may exist in a state of being intertwined with other unraveled defibrated material to form a lump (state of forming so-called "lump").

The defibrating portion 20 performs defibration with a dry method. Herein, performing treatment such as defibration in the air such as atmosphere (in air) rather than in a liquid is referred to as the dry method. As the defibrating portion 20, an impeller mill is used in this embodiment. The defibrating portion 20 has a function of generating the air flow that sucks the raw material and discharges the defibrated material. As a result, the defibrating portion 20 can suck the raw material together with the air flow from an introduction port 22 by the air flow generated by itself, and can perform defibration treatment to transport to a discharge port 24. The defibrated material that has passed through the defibrating portion 20 is transferred to the sorting portion 40 via a pipe 3.

In the sorting portion 40, the defibrated material defibrated by the defibrating portion 20 is introduced from an introduction port 42 and sorted according to the length of the fiber. As the sorting portion 40, for example, a sieve is used. The sorting portion 40 has a mesh (filter, screen) and can sort a fiber or a material smaller than a size of mesh sieve (those passing through the mesh, first sorted material), and a fiber, un-defibrated piece, or a lump larger than the size of mesh sieve (those not passing through the mesh, second sorted material). For example, the first sorted material is transferred to the mixing portion 50 via a pipe 7. The second sorted material is returned from a discharge port 44 to the defibrating portion 20 via a pipe 8. Specifically, the sorting portion 40 is a sieve of a cylinder rotationally driven by a motor. As the mesh of the sorting portion 40, for example, a wire mesh, an expanded metal obtained by stretching a metal plate with a notch, and a punching metal having a hole formed in a metal plate by a pressing machine or the like are used.

The first web forming portion 45 transports the first sorted material that has passed through the sorting portion 40 to the mixing portion 50. The first web forming portion 45 includes a mesh belt 46, a stretching roller 47, and a suction portion (suction mechanism) 48.

The suction portion 48 can suck the first sorted material dispersed in the air such as atmosphere (in air) through an opening (mesh opening) of the sorting portion 40 onto the mesh belt 46. The first sorted material is accumulated on the moving mesh belt 46 to form a web V. The basic configuration of the mesh belt 46, the stretching roller 47, and the suction portion 48 is the same as that of a mesh belt 72, a stretching roller 74, and a suction mechanism 76 of a second web forming portion 70 described later.

By passing through the sorting portion 40 and the first web forming portion 45, a web V containing a large amount of air and in a soft and swelling state is formed. The web V accumulated on the mesh belt 46 is introduced into the pipe 7 and transported to the mixing portion 50.

The rotating object 49 can cut the web V before the web V is transported to the mixing portion 50. In the illustrated example, the rotating object 49 has a base portion 49a and a projection portion 49b projecting from the base portion 49a. The projection portion 49b has, for example, a plate shape. In the illustrated example, four projection portions 49b are provided, and four projection portions 49b are provided at equal intervals. By rotation of the base portion 49a in a direction R, the projection portion 49b can rotate about the base portion 49a. By cutting the web V with the rotating object 49, it is possible to reduce fluctuation in the amount of defibrated material per unit time supplied to the accumulation portion 60, for example.

The rotating object 49 is provided in the vicinity of the first web forming portion 45. In the illustrated example, the rotating object 49 is provided in the vicinity of a stretching roller 47a (next to stretching roller 47a) located on the downstream side in the passage of the web V. The rotating object 49 is provided at a position where the projection portion 49b can be in contact with the web V and is not in contact with the mesh belt 46 on which the web V is accumulated. As a result, it is possible to prevent the mesh belt 46 from being worn (damaged) by the projection portion 49b. The shortest distance between the projection portion 49b and the mesh belt 46 is, for example, 0.05 mm or more and 0.5 mm or less.

The mixing portion 50 mixes the first sorted material (first sorted material transported by first web forming portion 45) that has passed through the sorting portion 40 and the additive including a resin. The mixing portion 50 has an additive supply portion 52 for supplying the additive, a pipe 54 for transporting the first sorted material and the additive, and a blower 56. In the illustrated example, the additive is supplied to the pipe 54 from the additive supply portion 52 via a hopper 9. The pipe 54 is continuous with the pipe 7.

In the mixing portion 50, air flow is generated by the blower 56, and the first sorted material and additives can be transported while being mixed in the pipe 54. The mechanism for mixing the first sorted material and the additive is not particularly limited, and may be a mechanism that stirs with a blade rotating at high speed, or a mechanism that uses rotation of a container like a V type mixer.

As the additive supply portion 52, a screw feeder as illustrated in FIG. 1, a disk feeder not illustrated or the like is used. The additive supplied from the additive supply portion 52 contains a resin for binding a plurality of fibers. When the resin is supplied, the plurality of fibers are not bound. When passing through the sheet forming portion 80, the resin melts and binds the plurality of fibers.

The resin supplied from the additive supply portion 52 is a thermoplastic resin or a thermosetting resin, and examples thereof include AS resin, ABS resin, polypropylene, polyethylene, polyvinyl chloride, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, and the like. These resins may be used singly or as a mixture thereof. The additive supplied from the additive supply portion 52 may be in a fibrous form or powder form.

The additives supplied from the additive supply portion 52 may contain a coloring agent for coloring the fibers, an aggregation inhibitor for preventing aggregation of the fibers, and a flame retardant for causing fibers less flammable, in addition to the resin binding the fibers, depending on the type of the sheet to be manufactured. The mixture (mixture of first sorted material and additive) that has passed through the mixing portion 50 is transferred to the accumulation portion 60 via the pipe 54.

The accumulation portion 60 introduces the mixture that has passed through the mixing portion 50 from an introduction port 62, unravels the intertwined defibrated material (fibers), and descends while dispersing in the air such as atmosphere (in air). Furthermore, in a case where the resin of the additive supplied from the additive supply portion 52 has a fibrous form, the accumulation portion 60 unravels the intertwined resin. As a result, the accumulation portion 60 can accumulate the mixture with good uniformity in the second web forming portion 70.

As the accumulation portion 60, a rotating cylindrical sieve is used. The accumulation portion 60 has a mesh and causes fibers or particles (fibers or material passing through mesh) smaller than the size of mesh sieve and contained in the mixture passed through the mixing portion 50 to descend. The configuration of the accumulation portion 60 is, for example, the same as that of the sorting portion 40.

The "sieve" of the accumulation portion 60 may not have the function of sorting out a specific object. That is, the "sieve" used as the accumulation portion 60 means that the sieve has a mesh, and the accumulation portion 60 may descend all of the mixture introduced to the accumulation portion 60.

The second web forming portion 70 accumulates a passing material that has passed through the accumulation portion 60 to form a web W. The second web forming portion 70 has, for example, a mesh belt 72, a stretching roller 74, and a suction mechanism 76.

While moving, the mesh belt 72 accumulates the passing material passing through the opening (opening of mesh) of the accumulation portion 60. The mesh belt 72 is stretched by the stretching roller 74, and is configured so as to allow air to pass therethrough with difficulty in passing the passing material. The mesh belt 72 moves as the stretching roller 74 rotates on its own axis. While the mesh belt 72 continuously moves, the passing material passing through the accumulation portion 60 continuously accumulates, so that the web W is formed on the mesh belt 72. The mesh belt 72 is formed of, for example, metal, resin, cloth, or nonwoven fabric.

The suction mechanism 76 is provided below the mesh belt 72 (on a side opposite to accumulation portion 60 side). The suction mechanism 76 can generate an air flow directed downward (air flow directed from the accumulation portion 60 to the mesh belt 72). By the suction mechanism 76, the mixture dispersed in the air by the accumulation portion 60 can be sucked onto the mesh belt 72. As a result, the discharge rate from the accumulation portion 60 can be increased. Furthermore, the suction mechanism 76 can form a down flow in the falling passage of the mixture, and it is possible to prevent from being intertwined with the defibrated material and the additive during the falling.

As described above, by passing through the accumulation portion 60 and the second web forming portion 70, a web W containing a large amount of air and in a soft and swelling state is formed. The web W accumulated on the mesh belt 72 is transported to the sheet forming portion 80.

In the illustrated example, a moisture conditioning portion 78 for conditioning the web W is provided. The moisture conditioning portion 78 can adjust the amount ratio between the web W and water by adding water or water vapor to the web W.

The sheet forming portion 80 presses and heats the web W accumulated on the mesh belt 72 to form a sheet S. In the sheet forming portion 80, a plurality of fibers in the mixture can be bound to each other via the additive (resin) by applying heat to the mixture of the defibrated material and additive mixed in the web W.

The sheet forming portion 80 is provided with a pressing portion 82 that presses the web W and a heating portion 84 that heats the web W pressed by the pressing portion 82. The pressing portion 82 is configured to include a pair of calender rollers 85, and applies pressure to the web W. As the web W is pressed, the thickness decreases and the density of the web W increases. As the heating portion 84, for example, a heating roller, a hot press molding machine, a hot plate, a hot air blower, an infrared heater, and a flash fixing device are used. In the illustrated example, the heating portion 84 is provided with a pair of heating rollers 86. By configuring the heating portion 84 as the pair of heating rollers 86, the sheet S can be formed while continuously transporting the web W, as compared with a case where the heating portion 84 is configured as a plate-like pressing device (flat plate pressing device). Here, the calender rollers 85 (pressing portion 82) can apply a pressure higher than the pressure applied to the web W by the heating rollers 86 (heating portion 84) to the web W. The number of the calender rollers 85 and the pair of heating rollers 86 is not particularly limited.

The cutting portion 90 cuts the sheet S formed by the sheet forming portion 80. In the illustrated example, the cutting portion 90 has a first cutting portion 92 for cutting the sheet S in a direction intersecting with the transport direction of the sheet S and a second cutting portion 94 for cutting the sheet S in a direction parallel to the transport direction. For example, the second cutting portion 94 cuts the sheet S that has passed through the first cutting portion 92.

As described above, a single sheet S of a predetermined size is formed. The cut single sheet S is discharged to a discharge portion 96.

Figure 2:
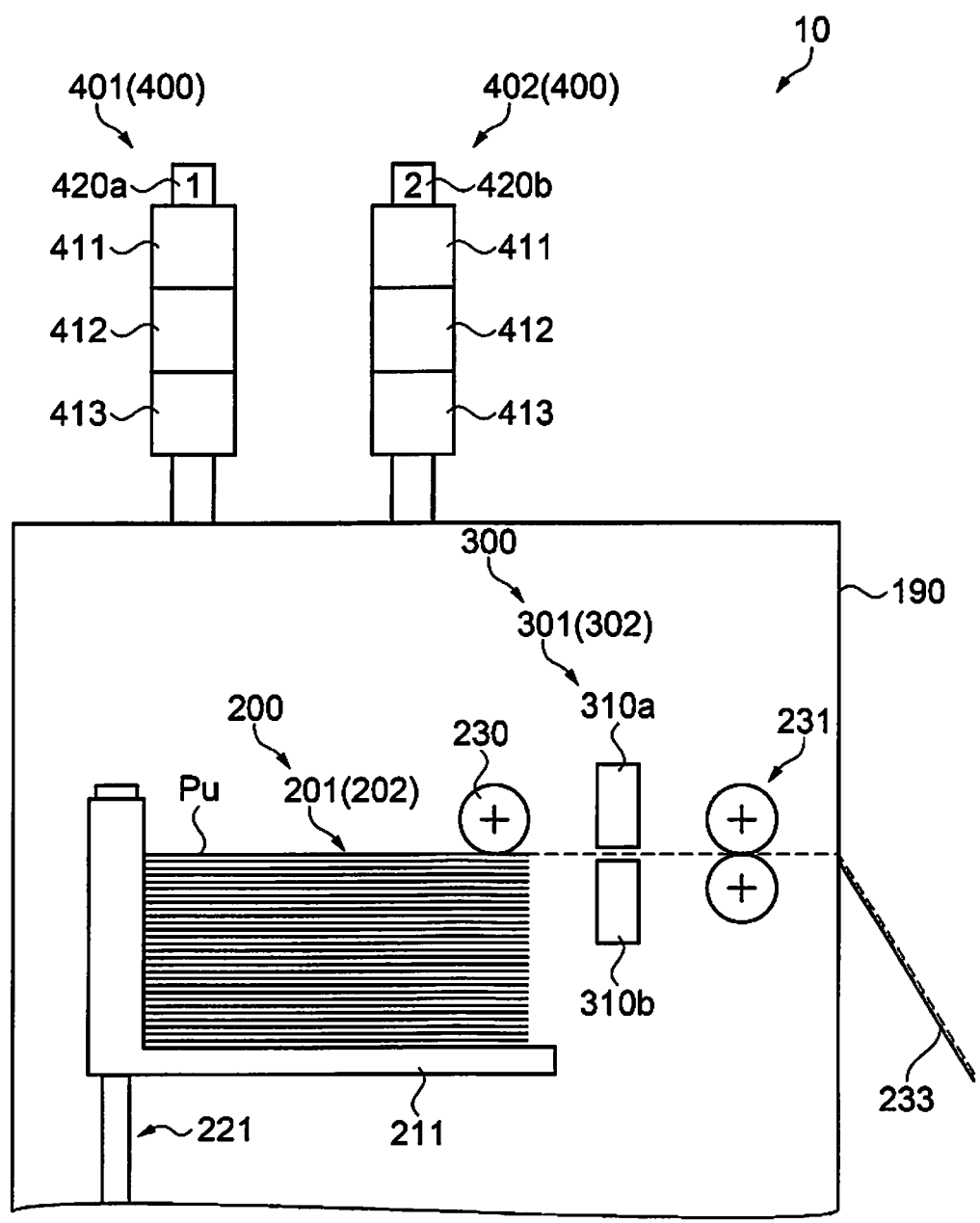
FIG. 2 is a schematic diagram illustrating a configuration of a supply portion according to the first embodiment.

Next, a configuration of the raw material supply device will be described. FIG. 2 is a schematic diagram illustrating the configuration of the raw material supply device. As illustrated in FIG. 2, a raw material supply device 10 is provided with the supply portion 200, a detection portion 300, and the control portion 104 (refer to FIG. 1). The control portion 104 of this example is provided commonly to the raw material supply device 10 and the sheet manufacturing apparatus 100, and governs overall control. A control portion may be separately provided in the raw material supply device 10 and the sheet manufacturing apparatus 100 so as to cooperate with each other. The raw material supply device 10 includes a housing 190, and the supply portion 200 and the detection portion 300 are accommodated in the housing 190. In the present embodiment, the raw material is a sheet-like raw material, for example, a case where a waste paper Pu of A4 size mainly used in an office or the like is supplied will be described.

The supply portion 200 is provided with a first supply portion (first supply mechanism) 201 and a second supply portion (second supply mechanism) 202. The first supply portion 201 is provided with a tray portion 211 for stacking and storing a plurality of waste papers Pu, a movement mechanism 221 for moving the tray portion 211 in a vertical direction, and the like. The movement mechanism 221 is formed of, for example, a ball screw or the like. A pickup roller 230 is disposed at a position corresponding to the uppermost waste paper Pu placed on the tray portion 211, and the waste paper Pu is delivered one by one. On the downstream side of the pickup roller 230 in the transport direction of the waste paper Pu, a pair of transport rollers 231 for transporting the waste paper Pu delivered by the pickup roller 230 is disposed. The waste paper Pu is transported by the pair of transport rollers 231 and is discharged (supplied) from the raw material supply device 10 along a guide portion 233 disposed outside the housing 190. Since the configuration of the second supply portion 202 is the same as the configuration of the first supply portion 201, the description is omitted. In addition, the arrangement of the first supply portion 201 and the second supply portion 202 is not particularly limited, and it may be disposed side by side in the vertical direction (gravity direction) or may be disposed side by side in the lateral direction (horizontal direction).

The supply portion 200 is not limited to the above configuration, and may be configured to supply the placed waste paper from the lowermost waste paper Pu not from the uppermost waste paper Pu, for example. In addition, in a case of a supply portion for supplying the paper piece crushed of the waste paper Pu to, for example, the defibrating portion 20, the supply portion can be formed of a hopper.

The first supply portion 201 and the second supply portion 202 according to the present embodiment are controlled by the control portion 104 so as to alternately supply the waste paper Pu.

The detection portion 300 detects the state of the supply portion 200, the detection portion 300 of the present embodiment includes a first detection portion 301 and a second detection portion 302, and the detection portion 300 is disposed corresponding to each of the first supply portion 201 and the second supply portion 202. As a result, it is possible to detect the state (normal state, abnormal state) in the first supply portion 201 and the second supply portion 202. The first detection portion 301 is disposed between the pickup roller 230 and the pair of transport rollers 231 in the transport path of the waste paper Pu. The first detection portion 301 is, for example, a photo interrupter, and is provided with a light emitting portion 310a that emits light and a light receiving portion 310b that receives light emitted from the light emitting portion 310a. For example, a light emitting diode (LED) light emitting element, a laser light emitting element, or the like is applied as the light emitting element of the light emitting portion 310a. In addition, the light receiving portion 310b is formed of a phototransistor, a photo IC, or the like. As a result, the presence or absence of the waste paper Pu between the light emitting portion 310a and the light receiving portion 310b (on the optical path of the first detection portion 301) can be detected.

The first detection portion 301 is connected to the control portion 104 and driven and controlled based on a predetermined program. The control portion 104 drives the first detection portion 301 to detect the presence or absence of the waste paper Pu by comparing the amount of light received by the light receiving portion 310b with a predetermined threshold. In a case where the presence or absence of waste paper Pu is repeatedly detected in synchronization with the driving of the pickup roller 230 and the pair of transport rollers 231, it is determined that the waste paper Pu is normally transported from the first supply portion 201 (normal operation state). On the other hand, in a case where the state where the amount of received light in the light receiving portion 310b does not change continues within a predetermined timing or within a predetermined time period, it is determined that the first supply portion 201 is in an abnormal state. For example, in a case where the waste paper Pu is not normally transported from first supply portion 201 due to transport trouble such as jam of the waste paper Pu, it is determined to be in an abnormal state. The configuration of the second detection portion 302 is the same as that of the first detection portion 301, and the explanation is omitted.

In addition, the detection portion 300 is not limited to the above-described configuration, and the detection portion 300 may acquire image information of the waste paper Pu using, for example, a CCD sensor, a CMOS sensor, or the like. In this case, for example, detection of wrinkles, folds, and the like of the waste paper Pu or detection of deposits such as needles of the stapler and clips attached to the waste paper Pu is possible by feature quantity analysis using density of each image in the image data of the waste paper Pu, and in a case where these are detected, the control portion 104 can determine that the waste paper Pu is not normally transported from the supply portion 200 (abnormal state).

In addition, reflected light or transmitted light of light irradiated on the waste paper Pu from a near-infrared light source is received by a photosensor, the type of paper is discriminated based on spectral analysis by fast Fourier transformation, and in a case where an undesirable type of paper is mixed, it may be determined that the paper is in an abnormal state. As a discrimination method of paper type, another method such as ultrasonic wave may be used.

In addition, it is also possible to detect the amount of raw materials optically or by ultrasonic wave or the like, and it may be determined that the material is in an abnormal state when the raw material runs out or when the raw material decreases less than the threshold.

In addition, when it is detected that a plurality of sheets of waste papers Pu is transported (double feeding) by ultrasonic waves, for example, the control portion 104 may determine that the supply portion 200 is in an abnormal state.

The configuration of the detection portion 300 may be combined as appropriate.

The raw material supply device 10 has a notification portion 400 for notifying the status of the supply portion 200. In the present embodiment, a first notification portion 401 for notifying the status of the first supply portion 201 and a second notification portion 402 for notifying the status of the second supply portion 202 are provided. The statuses of the first supply portion 201 and the second supply portion 202 include an operation state where the waste paper Pu is supplied, a pause state where the waste paper Pu is in an abnormal state and is unable to be supplied, and a standby state where the waste paper Pu is able to be supplied but waits without being supplied. The first notification portion 401 and the second notification portion 402 notify this status information. A state where each supply portion is capable of supplying the waste paper Pu is also referred to as a normal state and a state where each supply portion is unable to supply the waste paper Pu is also referred to as an abnormal state. The operation state and the standby state are included in the normal state, and the pause state is included in the abnormal state.

As illustrated in FIG. 2, the first notification portion 401 and the second notification portion 402 of the present embodiment are stacked type display lamps in which a red display portion 411, a yellow display portion 412, and a green display portion 413 are stacked, and are disposed at a top portion of the housing 190. The red display portion 411 corresponds to the pause state, the yellow display portion 412 corresponds to the standby state, and the green display portion 413 corresponds to the operation state. In addition, identification displays 420a and 420b for identifying that each notification portions 401 and 402 correspond to any supply portions 201 and 202 may be provided in each notification portions 401 and 402. As a result, the user can easily grasp the status of each of the first supply portion 201 and the second supply portion 202 by viewing the first notification portion 401 and the second notification portion 402. The configuration of the notification portion 400 is not limited to the above configuration. For example, the notification portion 400 may notify only the operation state and the pause state in two-color display, and may be configured to notify the status of the supply portion 200 by blinking display using a light emitting element, display by letters or symbols, or sound, beep sound, or the like. In this manner, the notification portion 400 notifies the user of the status of the supply portion 200 by outputting visual information or auditory information.

Figure 3:
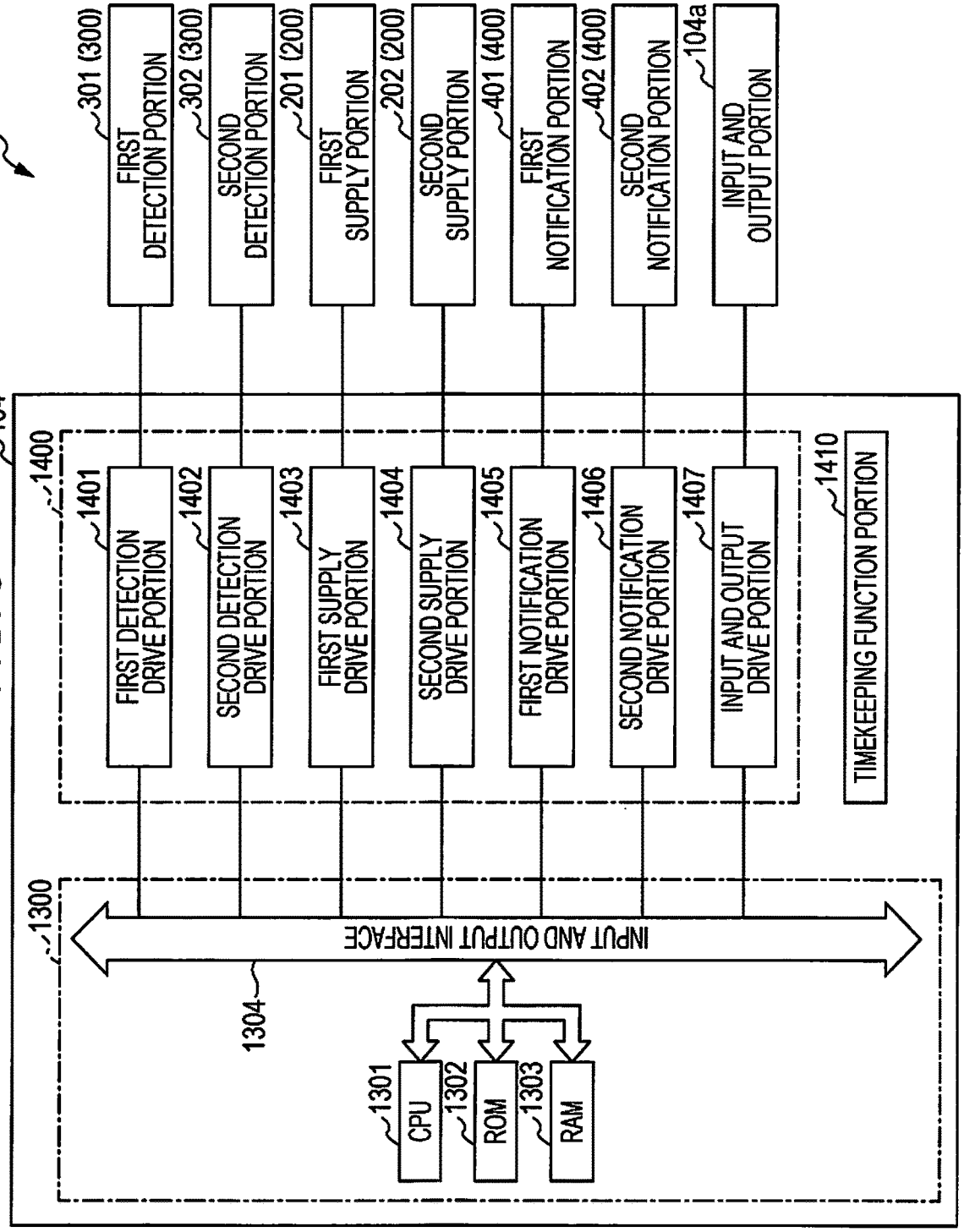
FIG. 3 is a control block diagram illustrating a configuration of a raw material supply device according to the first embodiment.

Next, the configuration of the control portion of the raw material supply device will be described. FIG. 3 is a control block diagram illustrating a configuration of the control portion of the raw material supply device. As illustrated in FIG. 3, the control portion 104 is provided with a command portion 1300, a drive portion 1400, a timekeeping function portion 1410, and the like. The command portion 1300 is formed of a CPU 1301, a ROM 1302 as storage means, a RAM 1303, and an input and output interface 1304, processes various signals input by the CPU 1301 via the input and output interface 1304 based on the data of the ROM 1302 and the RAM 1303, and outputs a control signal to the drive portion 1400 via the input and output interface 1304. The CPU 1301 performs various controls, for example, based on the control program stored in the ROM 1302. The timekeeping function portion 1410 is provided with a stopwatch function capable of measuring time, a calendar function capable of measuring date and time, and the like.

The drive portion 1400 is configured to include a first detection drive portion 1401, a second detection drive portion 1402, a first supply drive portion 1403, a second supply drive portion 1404, a first notification drive portion 1405, a second notification drive portion 1406, and an input and output drive portion 1407. Based on the control signal of the command portion 1300, the first detection drive portion 1401 drives and controls the first detection portion 301, the second detection drive portion 1402 drives and controls the second detection portion 302, the first supply drive portion 1403 drives and controls the first supply portion 201, the second supply drive portion 1404 drives and controls the second supply portion 202, the first notification drive portion 1405 drives and controls the first notification portion 401, and the second notification drive portion 1406 drives and controls the second notification portion 402. In addition, the input and output drive portion 1407 drives and controls an input and output portion 104a (refer to FIG. 1). The input and output portion 104a includes a setting portion for setting various conditions of the raw material supply device 10, and, for example, is configured to include a touch panel integrally configured with an input portion that can be operated by a user and a display portion that displays the status and the like of the raw material supply device 10.

When the plurality of supply portions 200 are in a normal state, the control portion 104 switches at a predetermined timing and causes each of the supply portions to alternately supply the waste paper Pu. That is, in the present embodiment, in a case where it is determined that the first supply portion 201 and the second supply portion 202 are in the normal state based on the detection result of the detection portion 300 (first detection portion 301, second detection portion 302), the first supply portion 201 and the second supply portion 202 are alternately operated at a predetermined timing to supply the waste paper Pu. The predetermined timing may be preset in the raw material supply device 10 or the sheet manufacturing apparatus 100 or may be set by the user as appropriate. The predetermined timing may be, for example, the supply amount (number of fed sheets) of the waste papers Pu supplied from the first supply portion 201 and the second supply portion 202, or may be a supply operation time (time division control) of the waste paper Pu by the first supply portion 201 and the second supply portion 202.

In addition, when any one of the supply portions (first supply portion 201 or second supply portion 202) is in the abnormal state, the control portion 104 causes another supply portion (first supply portion 201 or second supply portion 202) in the normal state to supply the waste paper Pu. As a result, even when one of the supply portions is in the abnormal state, the waste paper Pu is supplied from the other supply portion, so that the supply of the waste paper Pu can be continued without interruption. The abnormal state is a state where the supply of the waste paper Pu is disabled and, for example, the abnormal state is determined based on the detection result by the detection portion 300 (first detection portion 301, second detection portion 302).

In addition, the control portion 104 controls the supply portion 200 so that the supply amount of the raw material per unit time when a plurality of supply portions (first supply portion 201 and second supply portion 202) are in the normal state and the supply amount of the raw material per unit time when any of the supply portions 200 (first supply portion 201 or second supply portion 202) in the abnormal state are the same as each other. That is, in a state where the waste paper Pu is alternately supplied from the first supply portion 201 and the second supply portion 202, for example, in a case where the first supply portion 201 is in the abnormal state, the second supply portion 202 adds the amount of the supply amount of the raw material supplied by the first supply portion 201 to supply the waste paper Pu.

In addition, in the present embodiment, the control portion 104 operates the first supply portion 201 at a first operation rate and the second supply portion 202 at a second operation rate. The operation rate is the ratio of each of the supply amounts of the first supply portion 201 and the second supply portion 202 to the supply amount per unit time (for example, one minute) of the waste paper Pu from the supply portion 200. For example, in a case where the supply amount per unit time of the supply portion 200 is 10 sheets, eight sheets of waste papers Pu are supplied from the first supply portion 201, and two sheets of waste papers Pu are supplied from the second supply portion 202, the operation rate of the first supply portion 201 is 80%, and the operation rate of the second supply portion 202 is 20%. In the present embodiment, the operation rate of the first supply portion 201 is set to 50% (first operation rate) and the operation rate of the second supply portion 202 is set to 50% (second operation rate). In a case, since the first supply portion 201 and the second supply portion 202 have the same configuration, if the driving conditions such as the supply speed and the supply interval are the same as each other, the supply amounts (the number of fed sheets) of the waste papers Pu by the first supply portion 201 and the second supply portion 202 are the same as each other. As a result, it is possible to supply the waste paper Pu by operating the first supply portion 201 and the second supply portion 202 on average.

In a case where the first supply portion 201 is in the abnormal state, the second supply portion 202 is operated at an operation rate of 100%. As a result, even when one of the supply portions (for example, first supply portion 201) is in the abnormal state, the other supply portion (for example, second supply portion 202) supplements and supplies the waste paper Pu to be supplied by the supply portion in the abnormal state, so that the supply amount of the waste paper Pu can be maintained constant.

Figure 4:
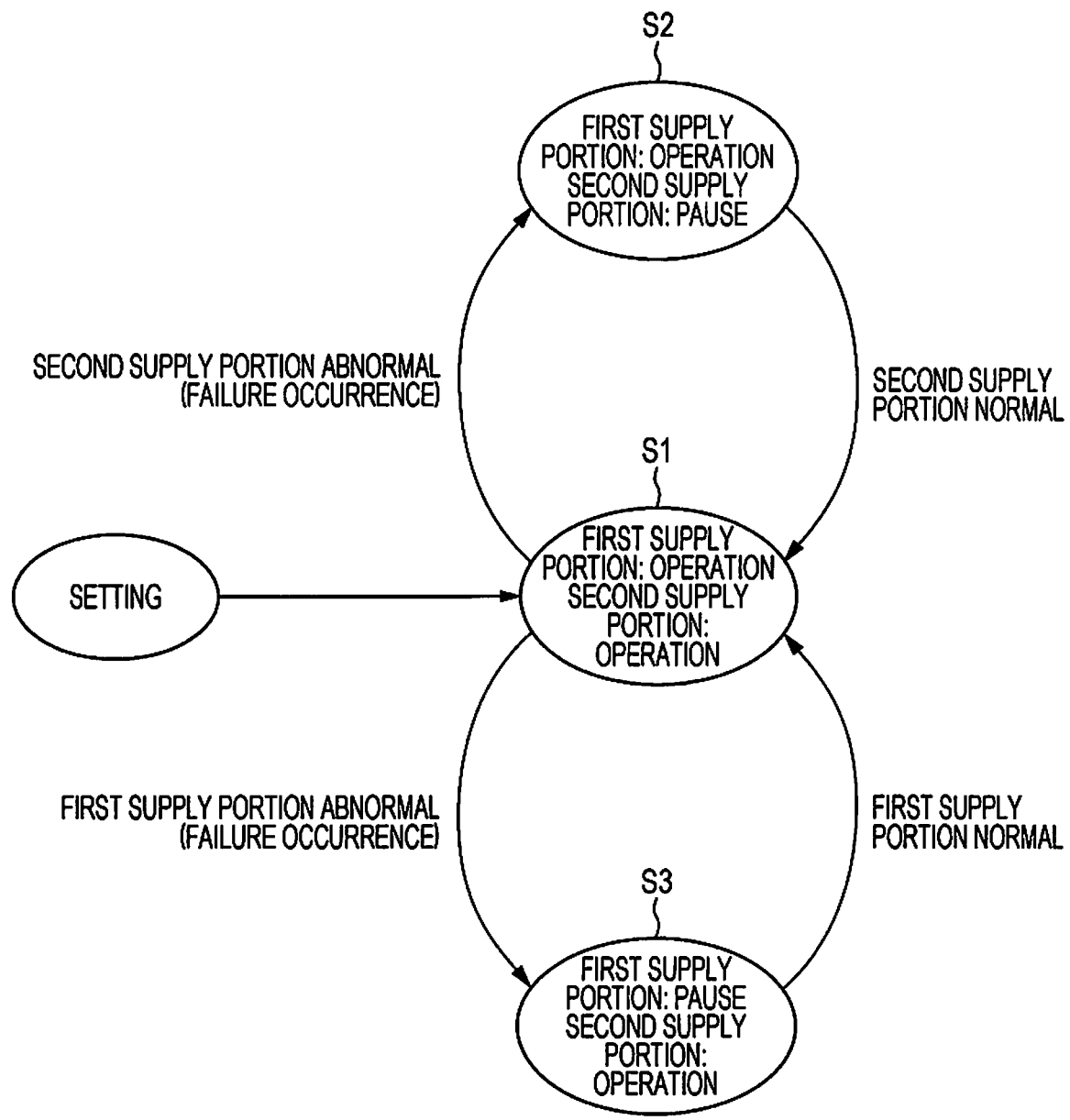
FIG. 4 is a state transition diagram illustrating a raw material feeding method of the raw material supply device according to the first embodiment.

Next, a method of supplying the raw material in the raw material supply device will be described. In the present embodiment, a method of supplying the raw material in the raw material supply device 10 will be described. FIG. 4 is a state transition diagram of the raw material supply device. FIGS. 5 to 8 are explanatory diagrams illustrating display examples in the input and output portion.

Figure 5:
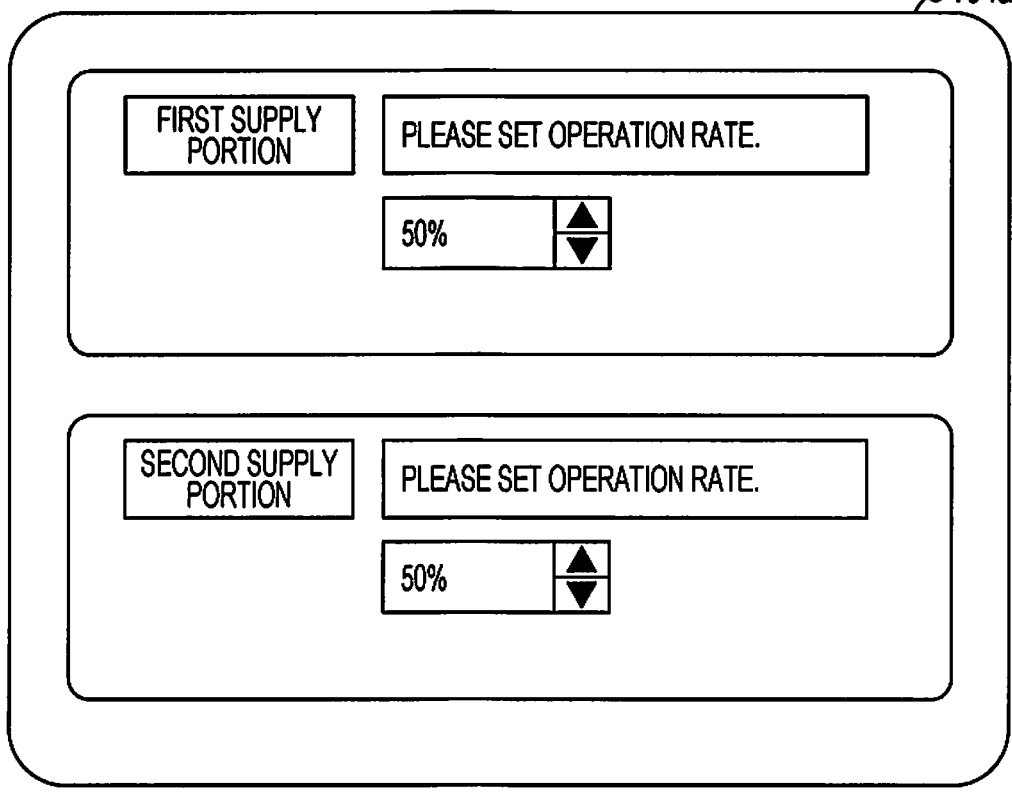
FIG. 5 is an explanatory diagram illustrating a display example in an input and output portion according to the first embodiment.

When the raw material supply device 10 (sheet manufacturing apparatus 100) is activated, initial setting of the raw material supply device 10 is performed. For example, the user selects the setting screen of the raw material supply device 10 from the menu of the input and output portion 104a, and inputs the operation condition of the raw material supply device 10. As one of the operating conditions, the operation rate of the first supply portion 201 and the operation rate of the second supply portion 202 are input. In the present embodiment, as illustrated in FIG. 5, the operation rate of the first supply portion 201 is set to 50% and the operation rate of the second supply portion 202 is set to 50%.

In addition, as one of the operating conditions, timing for switching the operation between the first supply portion 201 and the second supply portion 202 is set. This switching timing is set by the supply amount (number of fed sheets) corresponding to the operation rate. For example, in a case where the operation rate of the first supply portion 201 is 80% and the operation rate of the second supply portion 202 is 20%, the switching timing is set so as to switch to the second supply portion 202 and supply one sheet of waste paper Pu from the second supply portion 202 after four sheets of waste papers Pu are supplied from the first supply portion 201. In this manner, the operation rate and the switching timing are set so that there is no contradiction. In the present embodiment, since the operation rate of the first supply portion 201 and the second supply portion 202 is 50%, for example, the supply portions are set to switch each time one sheet of waste paper Pu is supplied.

The timing at which the operation is switched between the first supply portion 201 and the second supply portion 202 may be set to switch according to the supply operation time of the waste paper Pu. For example, in a case where the operation rate of the first supply portion 201 is 80% and the operation rate of the second supply portion 202 is 20%, the switching timing is set so as to switch to the second supply portion 202 and supply the waste paper Pu from the second supply portion 202 for two seconds after the waste paper Pu is supplied from the first supply portion 201 for eight seconds. In addition, in a case where the operation rates of the first and second supply portions 201 and 202 are 50%, the switching timing is set so as to switch each time the waste paper Pu is supplied for ten seconds.

After setting the operating conditions, the start switch is operated to operate the raw material supply device 10 (sheet manufacturing apparatus 100). The state of the raw material supply device 10 is the status S1.

Figure 6:
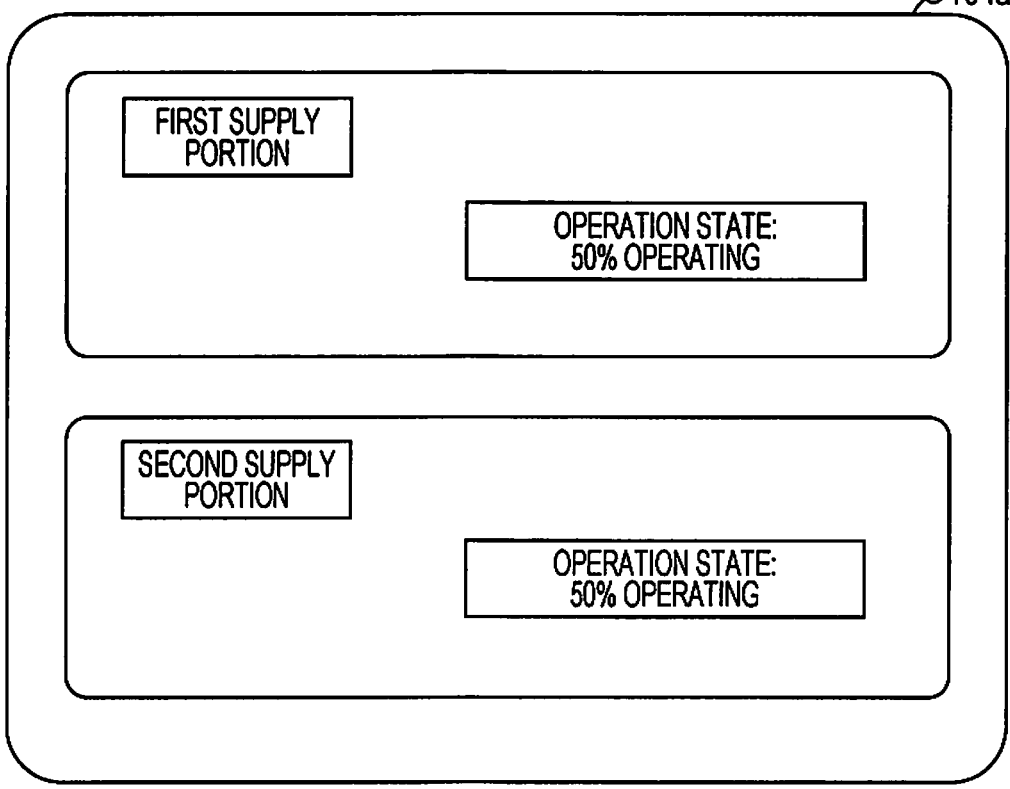
FIG. 6 is an explanatory diagram illustrating a display example in the input and output portion according to the first embodiment.

In the status S1, the first supply portion 201 and the second supply portion 202 are in the operating state. The first supply portion 201 and the second supply portion 202 are switched at a predetermined timing and alternately supply the waste paper Pu. At this time, the first notification portion 401 and the second notification portion 402 light the green display portion 413 corresponding to the operation state. On the status screen of the input and output portion 104a, as illustrated in FIG. 6, it is displayed that the first supply portion 201 and the second supply portion 202 are in the operating state.

In addition, in the status S1, the control portion 104 drives the first detection portion 301 corresponding to the first supply portion 201 and the second detection portion 302 corresponding to the second supply portion 202, and determines whether or not the first and second supply portions 201, 202 are in the abnormal state based on the detection results of the first and second detection portions 301, 302. In a case where it is determined that there is an abnormality in the second supply portion 202, the process shifts to the status S2, the second supply portion 202 is paused (stopped), and the waste paper Pu is supplied only from the normal first supply portion 201. On the other hand, in a case where it is determined that there is an abnormality in the first supply portion 201, the process shifts to the status S3, the first supply portion 201 is paused (stopped), and the waste paper Pu is supplied only from the normal second supply portion 202.

Figure 7:
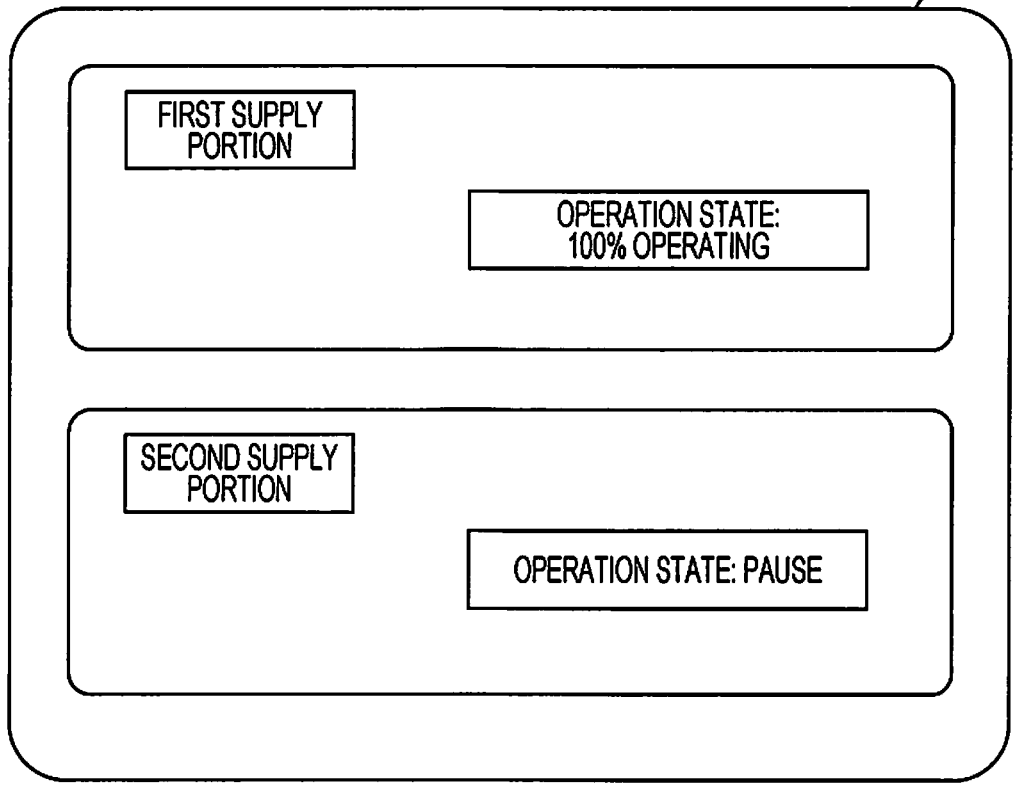
FIG. 7 is an explanatory diagram illustrating a display example in the input and output portion according to the first embodiment.

In the status S2, the status of the raw material supply device 10 is such that the first supply portion 201 is in the operation state and the second supply portion 202 is in the pause state. The control portion 104 operates by increasing the operation rate of the first supply portion 201 from 50% to 100% (operation rate of second supply portion 202 is 0%) so that the supply amount is the same as the supply amount per unit time in the status S1. As a result, even when the second supply portion 202 is unable to supply the waste paper Pu, it is possible to maintain the supply amount of the waste paper Pu without reducing the supply amount. In the status S2, the first notification portion 401 continuously turns on the green display portion 413. The second notification portion 402 turns off the green display portion 413 and turns on the red display portion 411 corresponding to the pause state. As illustrated in FIG. 7, on the status screen of the input and output portion 104a, it is displayed that the first supply portion 201 is in the operation state at the operation rate of 100% and the second supply portion 202 is in the pause state.

In addition, in the status S2, the control portion 104 performs a process of determining whether the second supply portion 202 in the pause state has returned to the normal state (whether abnormal state is eliminated). For example, in a case where a transport failure due to a jam of the waste paper Pu is detected by the second detection portion 302 and the second supply portion 202 is in the pause state, when the waste paper Pu causing the jam is removed from the transport path by the user, the control portion 104 can know that the jam (abnormal state) of the second supply portion 202 is eliminated based on the detection result of the second detection portion 302. In a case where it is determined that the second supply portion 202 has returned to the normal state, the process shifts to the status S1, the first supply portion 201 is operated at the first operation rate of 50%, the second supply portion 202 is operated at the second operation rate of 50%, and the waste paper Pu is supplied from the first supply portion 201 and the second supply portion 202.

The second supply portion 202 may temporarily be shifted to the standby state before shifting from the status S2 to the status S1. That is, the second supply portion 202 may be shifted to the operation state after shifting from the pause state to the standby state. In this manner, for example, frequent occurrence of state transition between the operation state and the pause state of the second supply portion 202, which occurs due to the abnormality of the second detection portion 302, can be inhibited.

Figure 8:
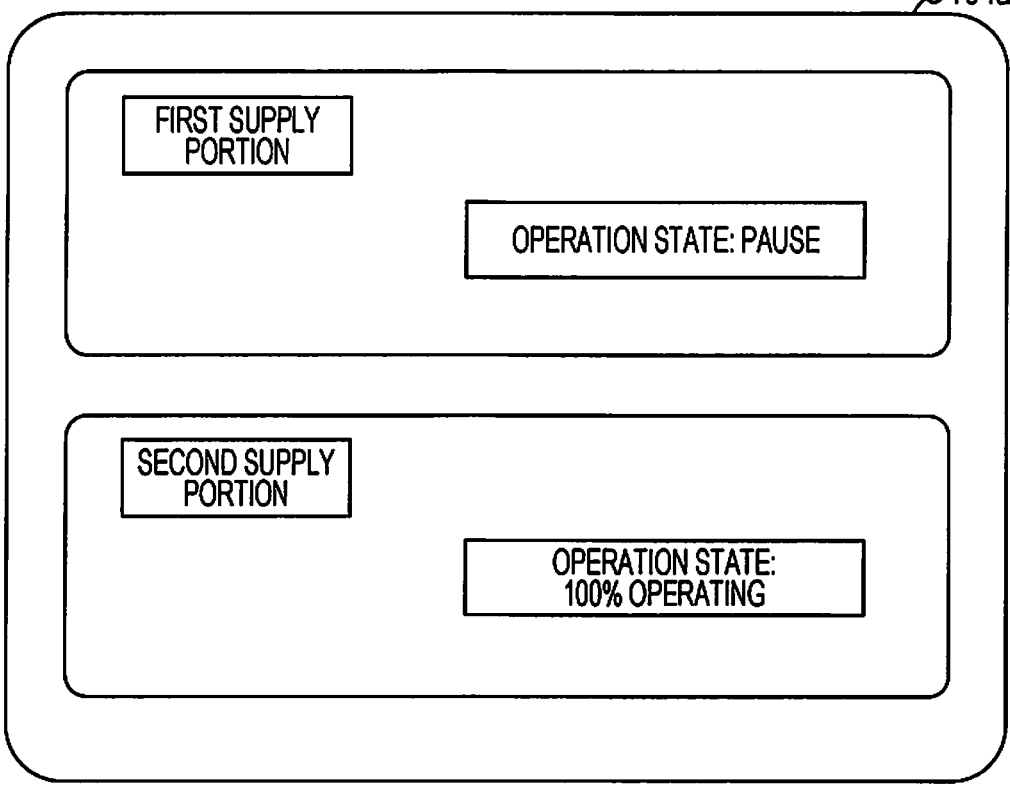
FIG. 8 is an explanatory diagram illustrating a display example in the input and output portion according to the first embodiment.

In the status S3, the status of the raw material supply device 10 is such that the first supply portion 201 is in the pause state and the second supply portion 202 is in the operation state. The control portion 104 operates by increasing the operation rate of the second supply portion 202 from 50% to 100% (operation rate of first supply portion 201 is 0%) so that the supply amount is the same as the supply amount per unit time in the status S1. As a result, even when the first supply portion 201 is unable to supply the waste paper Pu, it is possible to maintain the supply amount of the waste paper Pu without reducing the supply amount. In the status S3, the first notification portion 401 turns off the green display portion 413 and turns on the red display portion 411 corresponding to the pause state. The second notification portion 402 continuously turns on the green display portion 413. As illustrated in FIG. 8, on the status screen of the input and output portion 104a, it is displayed that the first supply portion 201 is in the pause state and the second supply portion 202 is in the operation state at the operation rate of 100%.

In addition, in the status S3, the control portion 104 determines whether the first supply portion 201 in the pause state has returned to the normal state (whether abnormal state is eliminated) based on the detection result of the first detection portion 301. In a case where it is determined that the first supply portion 201 has returned to the normal state, the process shifts to the status S1, the first supply portion 201 is operated at the first operation rate of 50%, the second supply portion 202 is operated at the second operation rate of 50%, and the waste paper Pu is supplied from the first supply portion 201 and the second supply portion 202.

The first supply portion 201 may temporarily be shifted to the standby state before shifting from the status S3 to the status S1. That is, the first supply portion 201 may be shifted to the operation state after shifting from the pause state to the standby state. In this manner, frequent occurrence of state transition between the operation state and the pause state of the first supply portion 201, which occurs due to the abnormality of the first detection portion 301, can be inhibited.

Hereinbefore, according to the present embodiment, the following effects can be obtained.

Since the waste paper Pu is supplied while switching between the first supply portion 201 and the second supply portion 202, the waste paper Pu stored in one of the supply portions is not left for a long time, which is useful for preventing leakage of secrets. In addition, the unbalance of operation is reduced, and the state of each supply portion can be kept satisfactory.

In addition, since the waste paper Pu is stably supplied from the raw material supply device 10, the sheet S can be efficiently manufactured.

Second Embodiment

Next, a second embodiment will be described. The configuration of the sheet manufacturing apparatus and the basic configuration of the raw material supply device according to the present embodiment are the same as those of the first embodiment, so the explanation is omitted.

The raw material supply device 10 of the present embodiment has at least three or more supply portions, and the control portion 104 selects at least two or more supply portions in accordance with a preset priority and causes each of the supply portions to supply the raw material. Specifically, the supply portion 200 of the raw material supply device 10 is provided with the first supply portion 201, the second supply portion 202, and the third supply portion (not shown). The configuration of the third supply portion is similar to that of the first supply portion 201. In addition, the detection portion 300 of the raw material supply device 10 is provided with the first detection portion 301 for detecting the state of the first supply portion 201, the second detection portion 302 for detecting the state of the second supply portion 202, and a third detection portion (not shown) for detecting the state of the third supply portion. The configuration of the third detection portion is similar to that of the first detection portion 301. In addition, the notification portion 400 of the raw material supply device 10 is provided with the first notification portion 401 corresponding to the first supply portion 201, the second notification portion 402 corresponding to the second supply portion 202, and the third notification portion (not shown) corresponding to the third supply portion. The configuration of the third notification portion is similar to that of the first notification portion 401.

Figure 9:
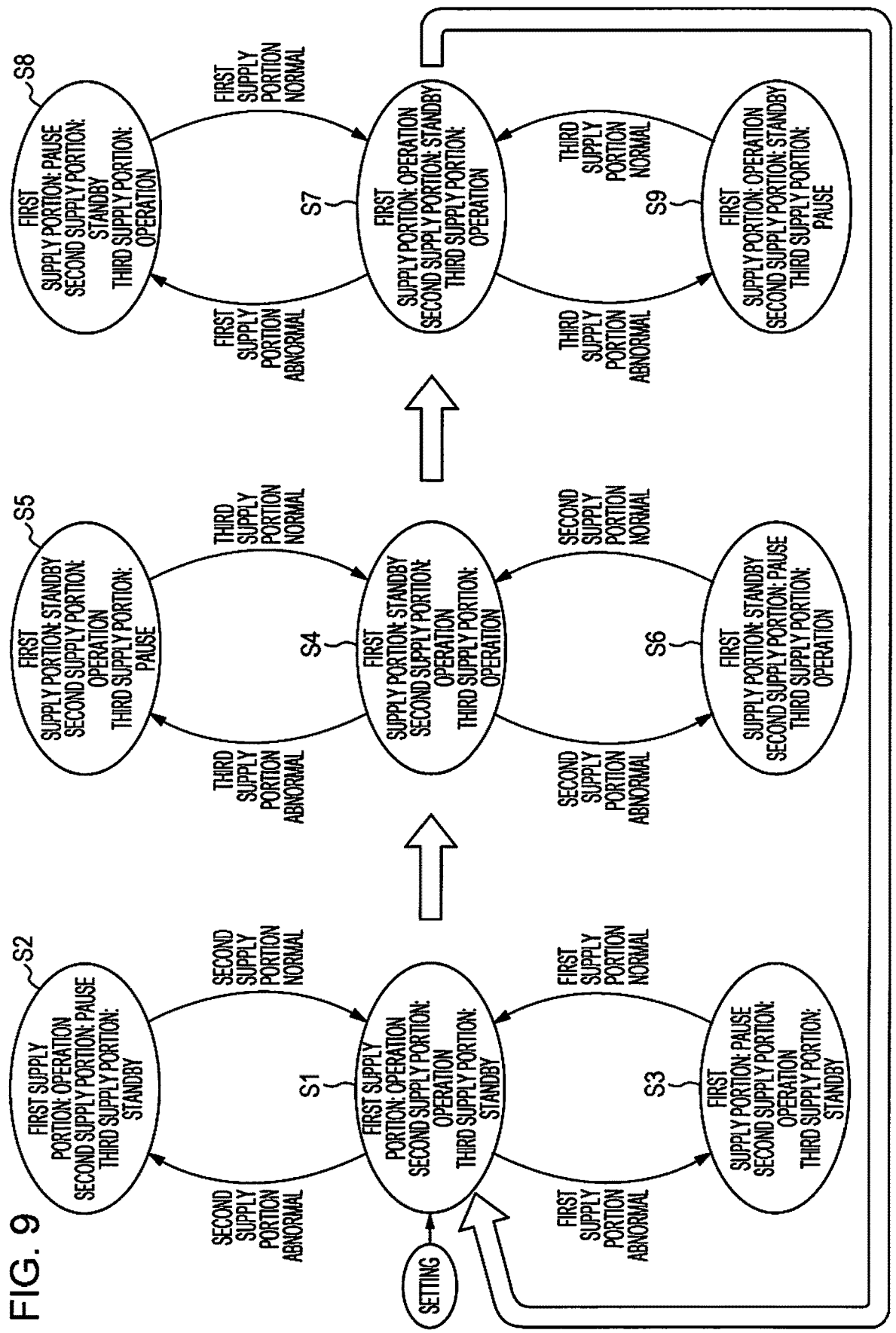
FIG. 9 is a state transition diagram illustrating a raw material feeding method of a raw material supply device according to a second embodiment.

Next, a method of supplying a raw material in the raw material supply device according to the present embodiment will be described. FIG. 9 is a state transition diagram of the raw material supply device. In addition, FIGS. 10 to 20 are explanatory diagrams illustrating display examples in the input and output portion.

In the present embodiment, a method of selecting two supply portions in the order of priority among the three supply portions (first supply portion 201, second supply portion 202, and third supply portion) and operating two supply portions while switching will be described.

When the raw material supply device 10 (sheet manufacturing apparatus 100) is activated, initial setting of the raw material supply device 10 is performed. For example, the user selects the setting screen of the raw material supply device 10 from the menu of the input and output portion 104a, and inputs the operating condition of the raw material supply device 10. As one of the operating conditions, the priority order of the supply portion 200 is set. As one of the operating conditions, the priority order of the supply portion 200 is set. For example, as illustrated in FIG. 10, the key of the priority "first" is pushed to the first supply portion 201, the key of the priority "second" is pushed to the second supply portion 202, and the key of the priority "third" is pushed to the third supply portion. As a result, the priority order of the supply portion 200 is set. In this case, the raw material supply device 10 firstly selects the first supply portion 201 and the second supply portion 202 as the first set and operates in this combination, then selects the second supply portion 202 and the third supply portion 203 as the second set and operates in this combination, and then selects the third supply portion 203 and the first supply portion 201 as the third set and operates in this combination.

Next, as one of the operating conditions, the operation rate of the supply portion 200 is input. The operation rate is set for each of the two supply portions (each of the above combinations) which are simultaneously in the operation state. The definition of the operation rate is the same as in the first embodiment. In the present embodiment, when setting the operation rate (X %) of the supply portion with the higher priority among the two supply portions, the operation rate of the supply portion with the lower priority is automatically set ((100−X) %). For example, as illustrated in FIG. 11, the operation rate of the first supply portion 201 is set to 50% in the first set, the operation rate of the second supply portion 202 is set to 50% in the second set, and the operation rate of the third supply portion is set to 50% in the third set. In the third set, the priority of the first supply portion 201 is higher than that of the third supply portion 203. However, in a case of such a combination of the highest and lowest priority, the operation rate of the supply portion with the low priority may be exceptionally set.

In addition, as one of the operating conditions, a timing for switching the operation is set between the two selected supply portions. For example, in a case of the first set, the first supply portion 201 and the second supply portion 202 are set to be switched each time one sheet of waste paper is supplied. The combination of other supply portions 200 is set in the same manner.

In addition, as one of the operating conditions, a timing for switching the combination of supply portions to be in an operation state is set. For example, the timing for switching from supply by the first set (combination of the first supply portion 201 and the second supply portion 202) to supply by the second set (combination of the second supply portion 202 and the third supply portion) is set. This switching timing is set by the supply amount (number of fed sheets) of the waste papers Pu of each set or the supply operation time. In a case of setting according to the supply amount, when the number of fed sheets of the set during the supply operation reaches a predetermined number (for example, 100 sheets), the set is set to switch to another set. In a case of setting in the supply operation time, when the supply operation time of the set during the supply operation reaches a predetermined time (for example, 1 hour), the set is set to switch to another set.

Thereafter, the start switch is operated to operate the raw material supply device 10 (sheet manufacturing apparatus 100). The state of the raw material supply device 10a is the status S1.

Figure 12:
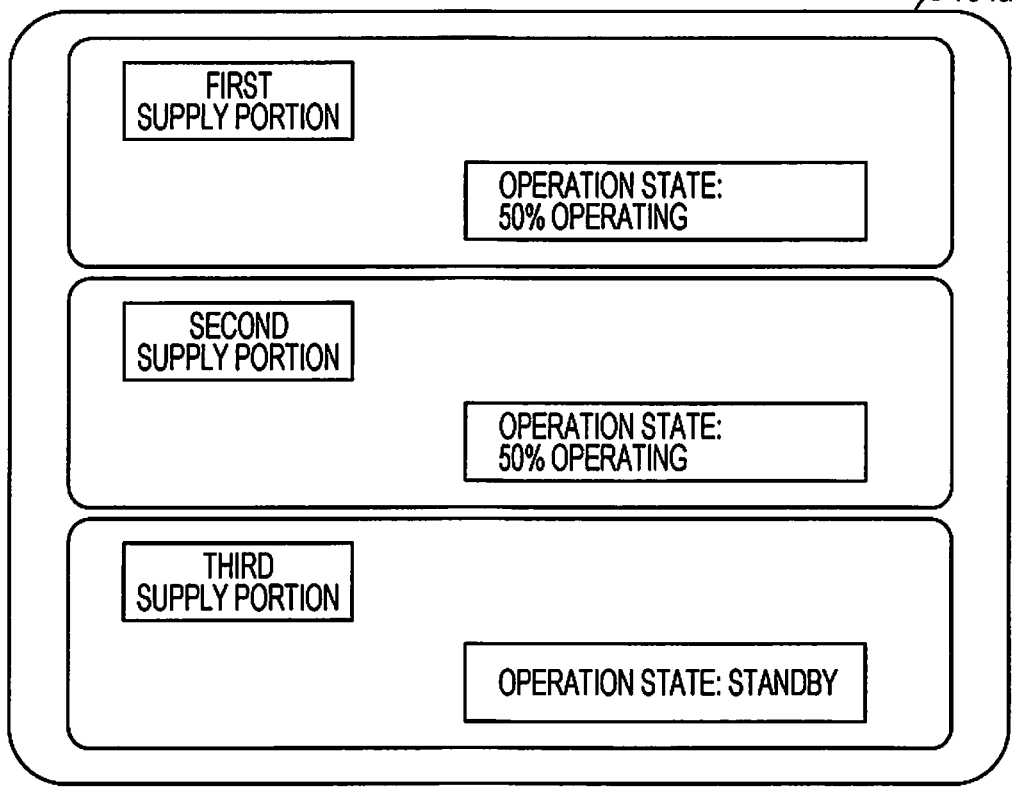
FIG. 12 is an explanatory diagram illustrating a display example in the input and output portion according to the second embodiment.

In the status S1, the status of the raw material supply device 10 is such that the first supply portion 201 and the second supply portion 202 are in the operation state, and the third supply portion is in the standby state. The first supply portion 201 and the second supply portion 202 are switched at a predetermined timing (every time one sheet of waste paper Pu is supplied in this example) to alternately supply the waste paper Pu. At this time, the first notification portion 401 and the second notification portion 402 turn on the green display portion 413 corresponding to the operation state. The third notification portion turns on the green display portion corresponding to the standby state. As illustrated in FIG. 12, on the status screen of the input and output portion 104a, it is displayed that the first supply portion 201 and the second supply portion 202 are in the operation state, and the third supply portion is in the standby state.

In addition, in the status S1, the control portion 104 drives the first and second detection portions 301, 302 corresponding to the first and second supply portions 201, 202 in the operation state, and determines whether or not the first and second supply portions 201, 202 are in the abnormal state based on the detection results of the first and second detection portions 301, 302. In a case where it is determined that there is an abnormality in the second supply portion 202, the process shifts to the status S2, the second supply portion 202 is paused (stopped), and the waste paper Pu is supplied only from the normal first supply portion 201. On the other hand, in a case where it is determined that there is an abnormality in the first supply portion 201, the process shifts to the status S3, the first supply portion 201 is paused (stopped), and the waste paper Pu is supplied only from the normal second supply portion 202.

Figure 13:
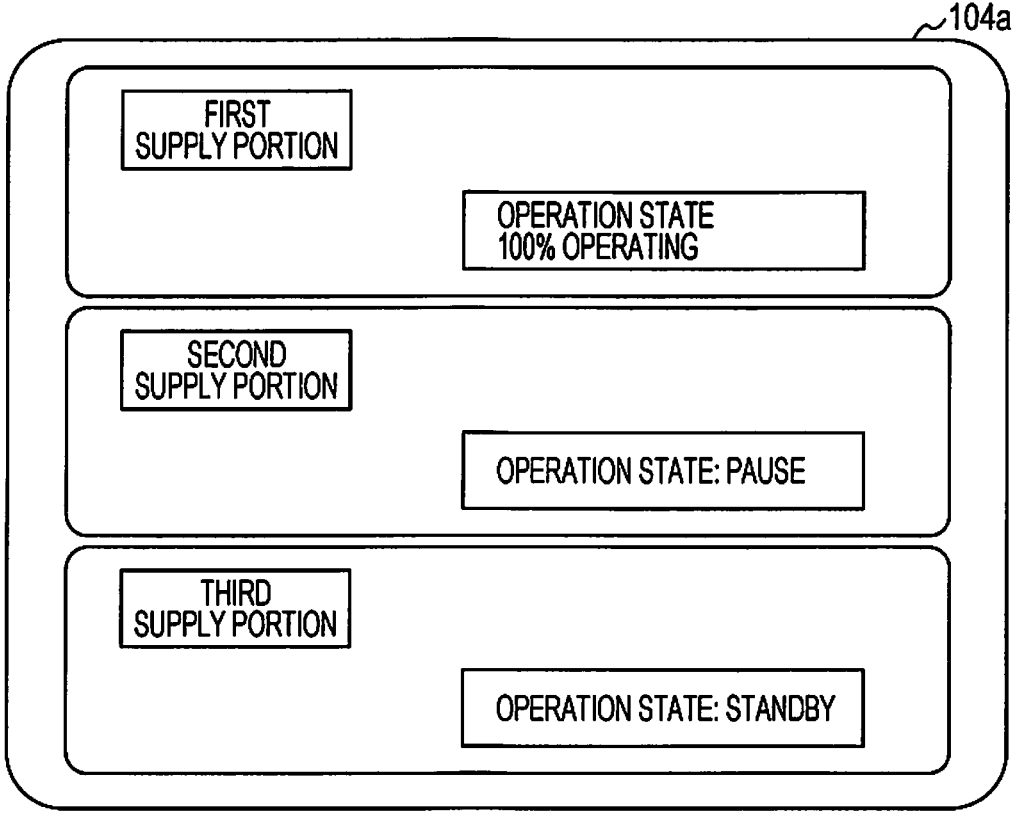
FIG. 13 is an explanatory diagram illustrating a display example in the input and output portion according to the second embodiment.

In the status S2, the status of the raw material supply device 10a is such that the first supply portion 201 is in the operation state, the second supply portion 202 are in the pause state, and the third supply portion is in the standby state. The control portion 104 operates by increasing the operation rate of the first supply portion 201 from 50% to 100% (operation rate of second supply portion 202 is 0%) so that the supply amount is the same as the supply amount per unit time of the waste paper Pu in the status S1. As a result, even when the second supply portion 202 is unable to supply the waste paper Pu, it is possible to maintain the supply amount of the waste paper Pu without reducing the supply amount. In the status S2, the first notification portion 401 continuously turns on the green display portion 413. The second notification portion 402 turns off the green display portion 413 and turns on the red display portion 411 corresponding to the pause state. The third notification portion continuously turns on the yellow display portion 412. As illustrated in FIG. 13, on the status screen of the input and output portion 104a, it is displayed that the first supply portion 201 is in the operation state at the operation rate of 100%, the second supply portion 202 is in the pause state, and the third supply portion is in the standby state.

In addition, in the status S2, the control portion 104 determines whether the second supply portion 202 in the pause state has returned to the normal state (whether abnormal state is eliminated) based on the detection result of the second detection portion 302. In a case where it is determined that the second supply portion 202 has returned to the normal state, the process shifts to the status S1, the first supply portion 201 is operated at the first operation rate of 50%, the second supply portion 202 is operated at the second operation rate of 50%, and the waste paper Pu is supplied from the first supply portion 201 and the second supply portion 202.

Figure 14:
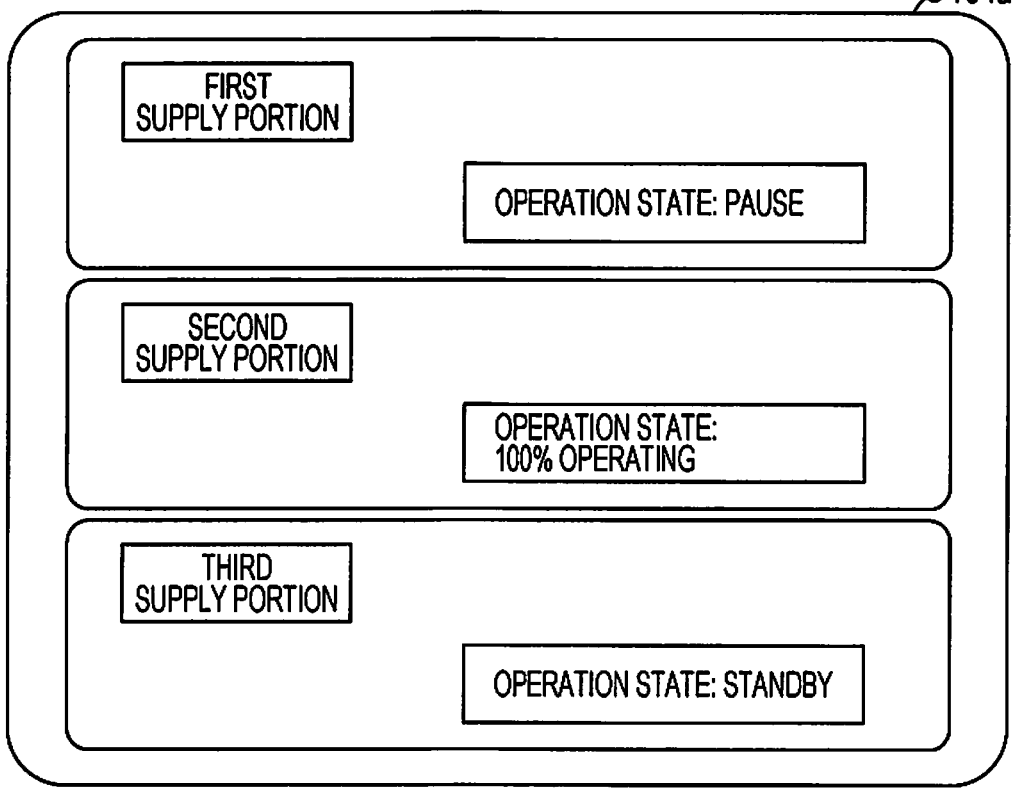
FIG. 14 is an explanatory diagram illustrating a display example in the input and output portion according to the second embodiment.

In the status S3, the status of the raw material supply device 10a is such that the first supply portion 201 is in the pause state, the second supply portion 202 is in the operation state, and the third supply portion is in the standby state. The control portion 104 operates by increasing the operation rate of the second supply portion 202 from 50% to 100% (operation rate of first supply portion 201 is 0%) so that the supply amount is the same as the supply amount per unit time of the waste paper Pu in the status S1. As a result, even when the first supply portion 201 is unable to supply the waste paper Pu, it is possible to maintain the supply amount of the waste paper Pu without reducing the supply amount. In the status S3, the first notification portion 401 turns off the green display portion 413 and turns on the red display portion 411 corresponding to the pause state. The second notification portion 402 continuously turns on the green display portion 413. The third notification portion continuously turns on the yellow display portion 412. As illustrated in FIG. 14, on the status screen of the input and output portion 104a, it is displayed that the first supply portion 201 is in the pause state, the second supply portion 202 is in the operation state at the operation rate of 100%, and the third supply portion is in the standby state.

In addition, in the status S3, the control portion 104 determines whether the first supply portion 201 in the pause state has returned to the normal state (whether abnormal state is eliminated) based on the detection result of the first detection portion 301. In a case where it is determined that the first supply portion 201 has returned to the normal state, the process shifts to the status S1, the first supply portion 201 is operated at the first operation rate of 50%, the second supply portion 202 is operated at the second operation rate of 50%, and the waste paper Pu is supplied from the first supply portion 201 and the second supply portion 202.

Figure 15:
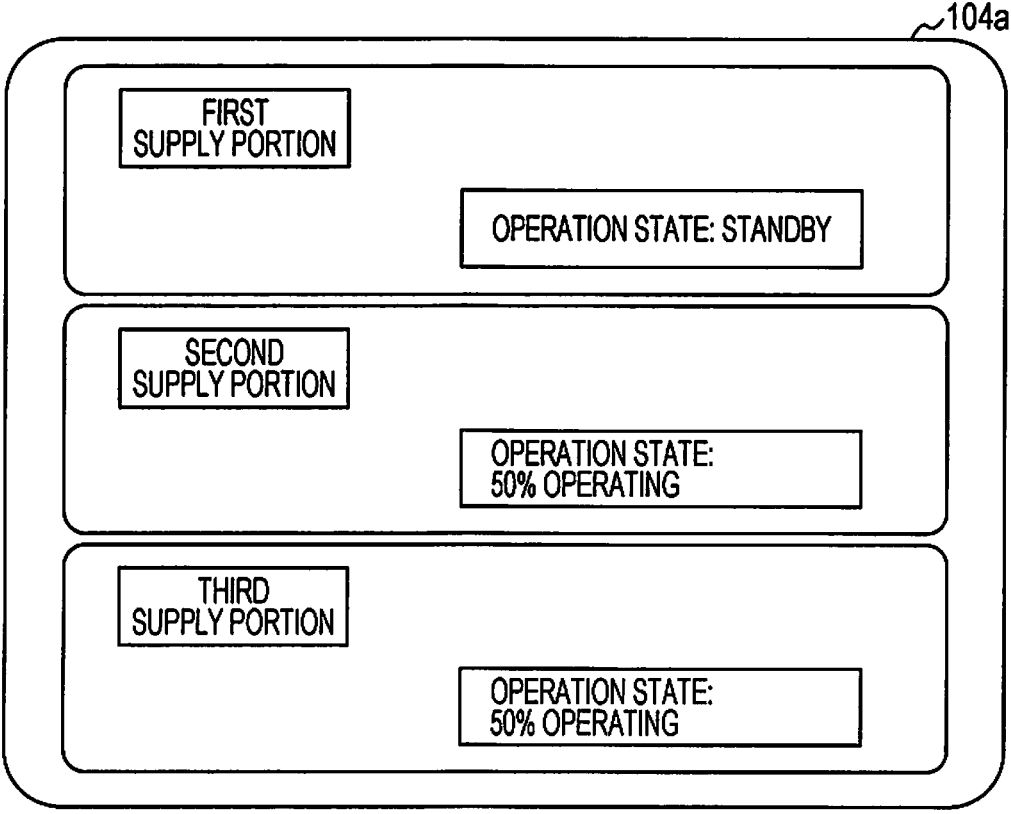
FIG. 15 is an explanatory diagram illustrating a display example in the input and output portion according to the second embodiment.

Next, at a predetermined timing (in the present example, when the supply amount reaches the set value), the status shifts from the statuses S1 to S3 to the status S4. In the status S4, the status of the raw material supply device 10 is such that the second supply portion 202 and the third supply portion are in the operation state, the first supply portion 201 is in the standby state. The second supply portion 202 and the third supply portion are switched at a predetermined timing (every time one sheet of waste paper Pu is supplied in this example) to alternately supply the waste paper Pu. At this time, the second notification portion 402 and the third notification portion turn on the green display portion 413 corresponding to the operation state. The first notification portion 401 turns on the yellow display portion 412 corresponding to the standby state. As illustrated in FIG. 15, on the status screen of the input and output portion 104a, it is displayed that the second supply portion 202 and the third supply portion are in the operation state, and the first supply portion 201 is in the standby state.

In addition, in the status S4, the control portion 104 drives the second detection portion 302 corresponding to the second supply portion 202 and the third detection portion corresponding to the third supply portion, and determines whether or not the second and third supply portions are in the abnormal state based on the detection results of the second and third detection portions. In a case where it is determined that there is an abnormality in the third supply portion, the process shifts to the status S5, the third supply portion is paused (stopped), and the waste paper Pu is supplied only from the normal second supply portion 202. On the other hand, in a case where it is determined that there is an abnormality in the second supply portion 202, the process shifts to the status S6, the second supply portion 202 is paused (stopped), and the waste paper Pu is supplied only from the normal third supply portion.

Figure 16:
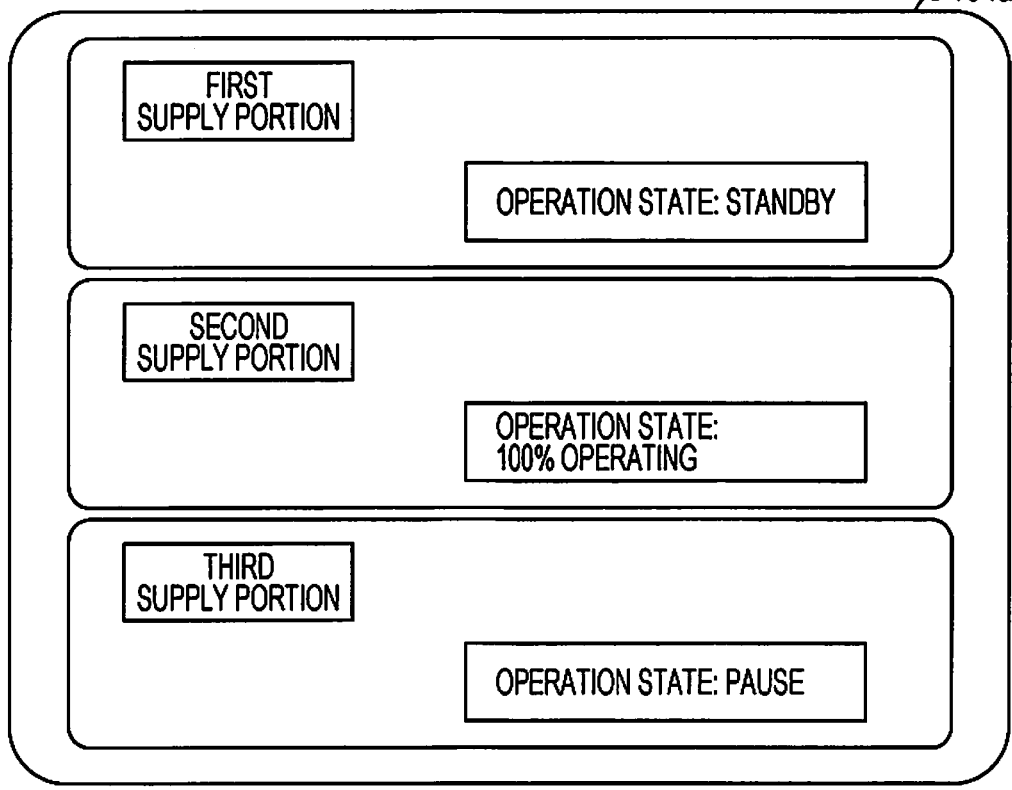
FIG. 16 is an explanatory diagram illustrating a display example in the input and output portion according to the second embodiment.

In the status S5, the status of the raw material supply device 10 is such that second supply portion 202 is in the operation state, the third supply portion is in the pause state, and the first supply portion 201 is in the standby state. The control portion 104 operates by increasing the operation rate of the second supply portion 202 from 50% to 100% (operation rate of third supply portion is 0%) so that the supply amount is the same as the supply amount per unit time of the waste paper Pu in the status S4. As a result, even when the third supply portion is unable to supply the waste paper Pu, it is possible to maintain the supply amount of the waste paper Pu without reducing the supply amount. In the status S5, the second notification portion 402 continuously turns on the green display portion 413. The third notification portion turns off the green display portion 413 and turns on the red display portion 411 corresponding to the pause state. The first notification portion 401 continuously turns on the yellow display portion 412. As illustrated in FIG. 16, on the status screen of the input and output portion 104a, it is displayed that the second supply portion 202 is in the operation state at the operation rate of 100%, the third supply portion is in the pause state, and the first supply portion 201 is in the standby state.

In addition, in the status S5, the control portion 104 determines whether the third supply portion in the pause state has returned to the normal state (whether abnormal state is eliminated) based on the detection result of the third detection portion. In a case where it is determined that the third supply portion has returned to the normal state, the process shifts to the status S4, and the waste paper Pu is supplied from the second supply portion 202 and the third supply portion.

Figure 17:
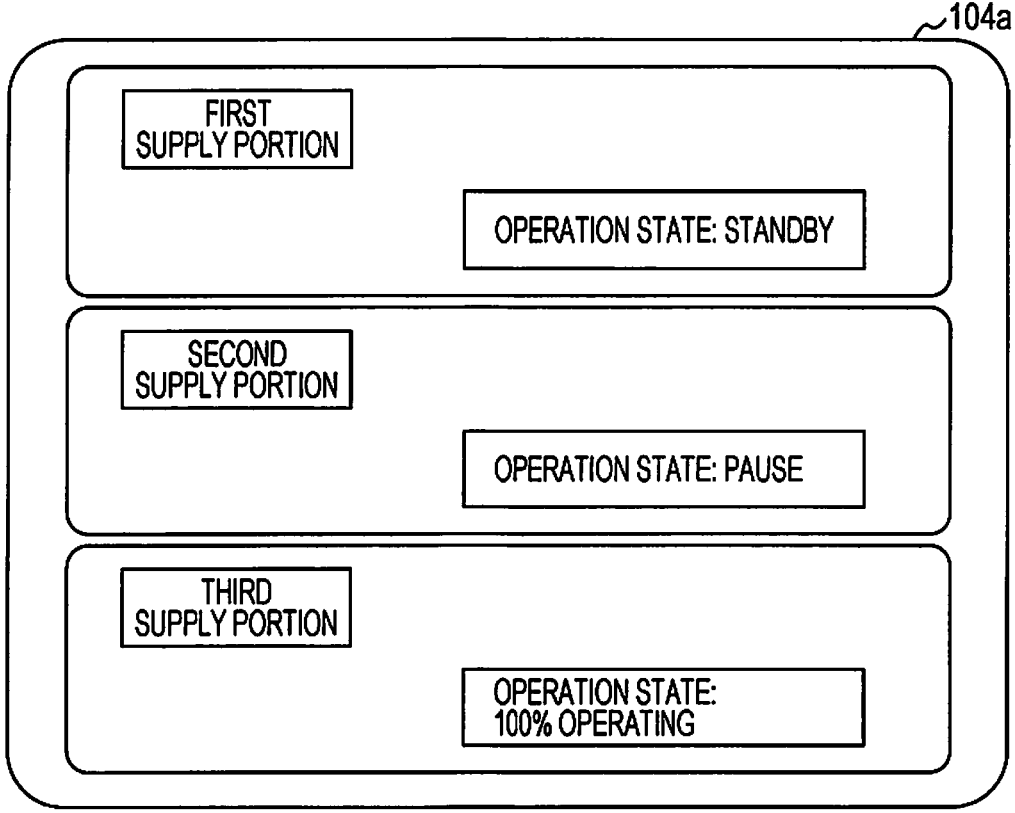
FIG. 17 is an explanatory diagram illustrating a display example in the input and output portion according to the second embodiment.

In the status S6, the status of the raw material supply device 10 is such that the second supply portion 202 is in the pause state, the third supply portion is in the operation state, and the first supply portion 201 is in the standby state. The control portion 104 operates by increasing the operation rate of the third supply portion from 50% to 100% (operation rate of second supply portion 202 is 0%) so that the supply amount is the same as the supply amount per unit time of the waste paper Pu in the status S4. As a result, even when the second supply portion 202 is unable to supply the waste paper Pu, it is possible to maintain the supply amount of the waste paper Pu without reducing the supply amount. In the status S6, the second notification portion 402 turns off the green display portion 413 and turns on the red display portion 411 corresponding to the pause state. The third notification portion continuously turns on the green display portion 413. The first notification portion 401 continuously turns on the yellow display portion 412. As illustrated in FIG. 17, on the status screen of the input and output portion 104a, it is displayed that the second supply portion 202 is in the pause state, the third supply portion is in the operation state at the operation rate of 100%, and the first supply portion 201 is in the standby state.

In addition, in the status S6, the control portion 104 determines whether the second supply portion 202 in the pause state has returned to the normal state (whether abnormal state is eliminated) based on the detection result of the second detection portion 302. In a case where it is determined that the second supply portion 202 has returned to the normal state, the process shifts to the status S4, and the waste paper Pu is supplied from the second supply portion 202 and the third supply portion.

Figure 18:
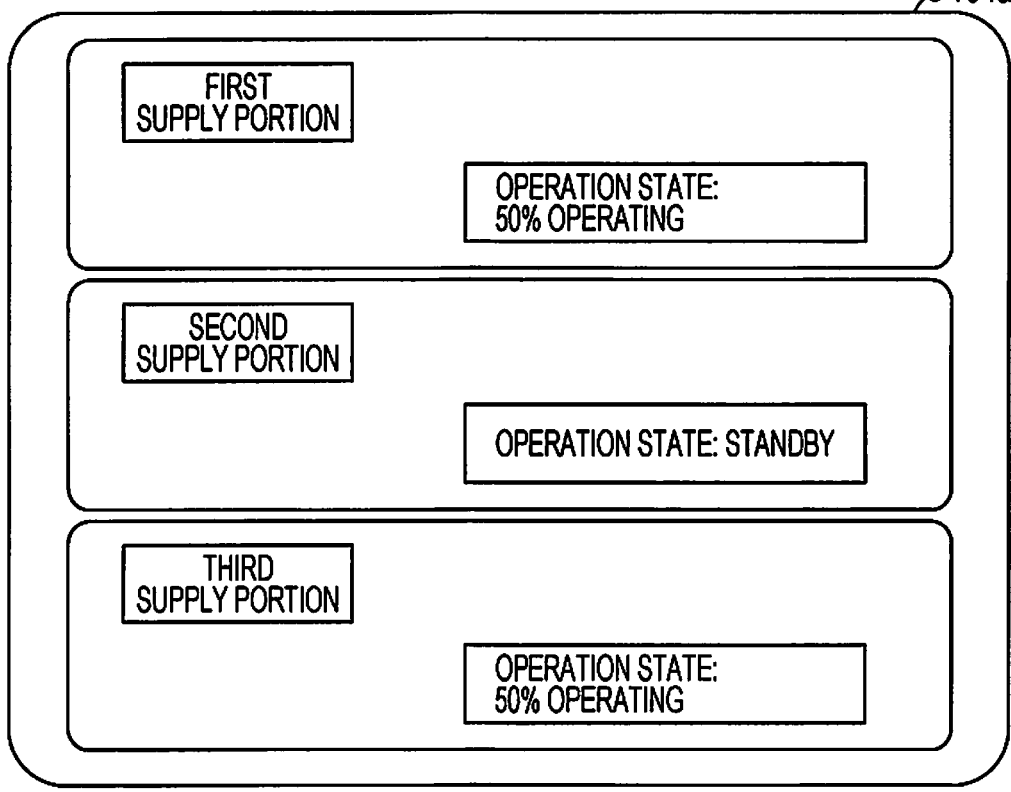
FIG. 18 is an explanatory diagram illustrating a display example in the input and output portion according to the second embodiment.

Next, at a predetermined timing (in the present example, when the supply amount reaches the set value), the status shifts from the statuses S4 to S6 to the status S7. In the status S7, the status of the raw material supply device 10 is such that the first supply portion 201 and the third supply portion are in the operation state, the second supply portion 202 is in the standby state. The first supply portion 201 and the third supply portion are switched at a predetermined timing (every time one sheet of waste paper Pu is supplied in this example) to alternately supply the waste paper Pu. At this time, the first notification portion 401 and the third notification portion turn on the green display portion 413 corresponding to the operation state. The second notification portion 402 turns on the yellow display portion 412 corresponding to the standby state. As illustrated in FIG. 18, on the status screen of the input and output portion 104a, it is displayed that the first supply portion 201 and the third supply portion are in the operation state, and the second supply portion 202 is in the standby state.

In addition, in the status S7, the control portion 104 drives the first detection portion 301 corresponding to the first supply portion 201 and the third detection portion corresponding to the third supply portion, and determines whether or not the first and third supply portions are in the abnormal state based on the detection results of the first and third detection portions. In a case where it is determined that there is an abnormality in the first supply portion 201, the process shifts to the status S8, the first supply portion 201 is paused (stopped), and the waste paper Pu is supplied only from the normal third supply portion. On the other hand, in a case where it is determined that there is an abnormality in the third supply portion, the process shifts to the status S9, the third supply portion is paused (stopped), and the waste paper Pu is supplied only from the normal first supply portion 201.

Figure 19:
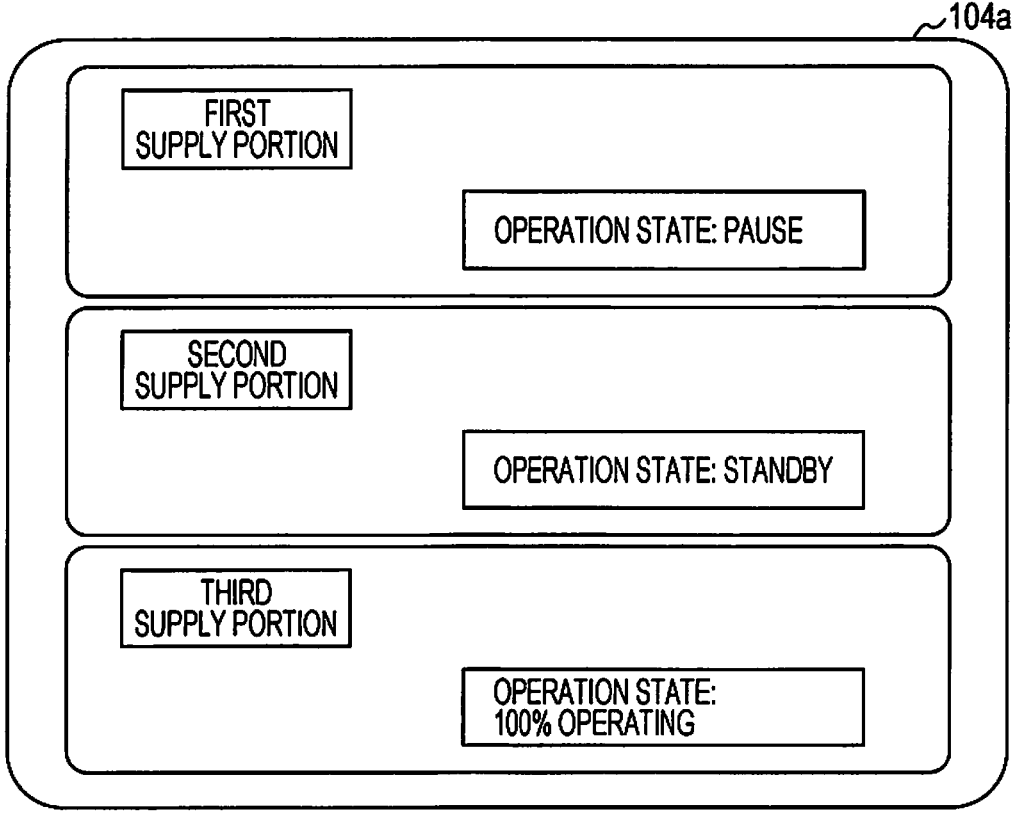
FIG. 19 is an explanatory diagram illustrating a display example in the input and output portion according to the second embodiment.

In the status S8, the status of the raw material supply device 10 is such that the third supply portion is in the operation state, the first supply portion 201 is in the pause state, and the second supply portion 202 is in the standby state. The control portion 104 operates by increasing the operation rate of the third supply portion from 50% to 100% (operation rate of first supply portion 201 is 0%) so that the supply amount is the same as the supply amount per unit time of the waste paper Pu in the status S7. As a result, even when the first supply portion 201 is unable to supply the waste paper Pu, it is possible to maintain the supply amount of the waste paper Pu without reducing the supply amount. In the status S8, the first notification portion 401 turns off the green display portion 413 and turns on the red display portion 411 corresponding to the pause state. The third notification portion continuously turns on the green display portion 413. The second notification portion 402 continuously turns on the yellow display portion 412. As illustrated in FIG. 19, on the status screen of the input and output portion 104a, it is displayed that the first supply portion 201 is in the pause state, the third supply portion is in the operation state at the operation rate of 100%, and the second supply portion 202 is in the standby state.

In addition, in the status S8, the control portion 104 determines whether the first supply portion 201 in the pause state has returned to the normal state (whether abnormal state is eliminated) based on the detection result of the first detection portion 301. In a case where it is determined that the first supply portion 201 has returned to the normal state, the process shifts to the status S7, and the waste paper Pu is supplied from the first supply portion 201 and the third supply portion.

Figure 20:
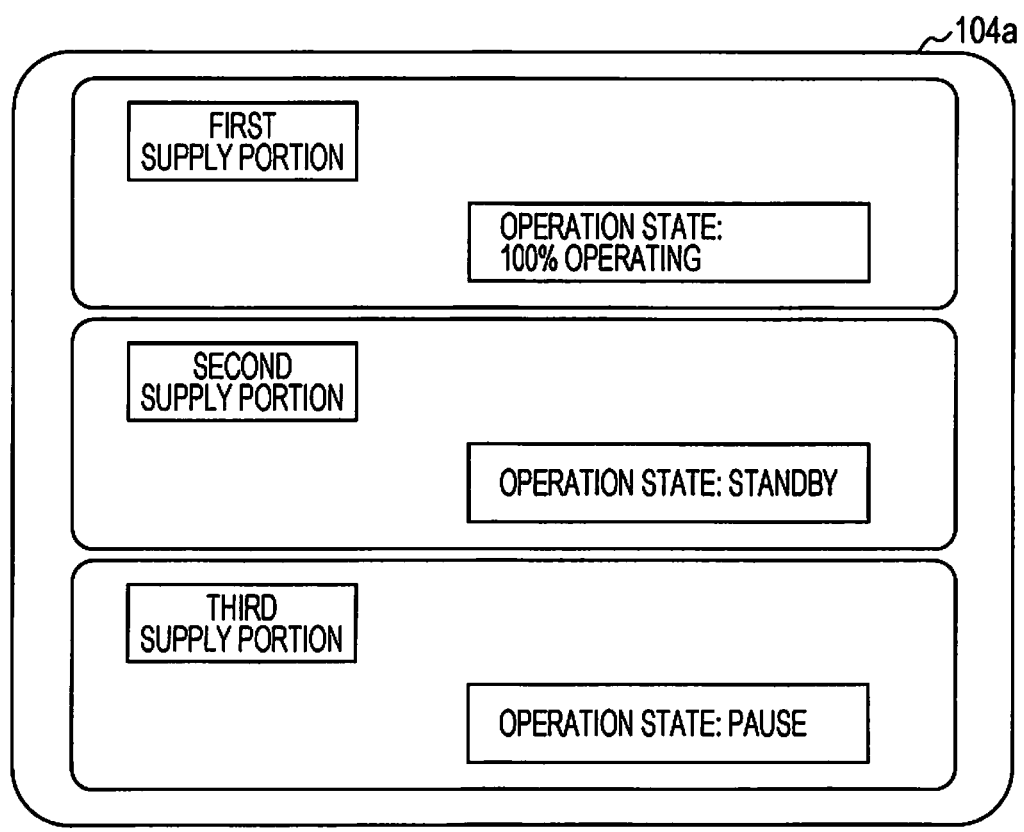
FIG. 20 is an explanatory diagram illustrating a display example in the input and output portion according to the second embodiment.

In the status S9, the status of the raw material supply device 10 is such that the first supply portion 201 is in the operation state, the third supply portion is in the pause state, and the second supply portion 202 is in the standby state. The control portion 104 operates by increasing the operation rate of the first supply portion 201 from 50% to 100% (operation rate of third supply portion is 0%) so that the supply amount is the same as the supply amount per unit time of the waste paper Pu in the status S7. As a result, even when the third supply portion is unable to supply the waste paper Pu, it is possible to maintain the supply amount of the waste paper Pu without reducing the supply amount. In the status S9, the first notification portion 401 continuously turns on the green display portion 413. The third notification portion turns off the green display portion 413 and turns on the red display portion 411 corresponding to the pause state. The second notification portion 402 continuously turns on the yellow display portion 412. As illustrated in FIG. 20, on the status screen of the input and output portion 104a, it is displayed that the first supply portion 201 is in the operation state at the operation rate of 100%, the third supply portion is in the pause state, and the second supply portion 202 is in the standby state.

In addition, in the status S9, the control portion 104 determines whether the third supply portion in the pause state has returned to the normal state (whether abnormal state is eliminated) based on the detection result of the third detection portion. In a case where it is determined that the third supply portion has returned to the normal state, the process shifts to the status S7, and the waste paper Pu is supplied from the first supply portion 201 and the third supply portion.

Similarly to the first embodiment, in a case of shifting the supply portion in the pause state to the operation state, the standby state may be passed. That is, it may be shifted from the pause state to the standby state and thereafter to the operating state. In this manner, frequent occurrence of state transitions between the operation state and the pause state of each supply portion, which occurs due to abnormality of each detection portion, is reduced.

Hereinbefore, according to the present embodiment, the following effects can be obtained.

According to this configuration, since the three supply portions (first supply portion 201, second supply portion 202, and third supply portion) are provided, it is possible to more stably supply the waste paper Pu. In addition, since the waste paper Pu is supplied while switching the first supply portion 201 and the second supply portion 202, the second supply portion 202 and the third supply portion, and the first supply portion 201 and the third supply portion as a respective set, the unbalance of operation among the respective supply portions is reduced, and the state of each supply portion can be kept satisfactory.

The present invention is not limited to the above-described embodiments, and various modifications and improvements can be added to the above-described embodiments. In addition, a plurality of embodiments may be combined within a range not technically contradictory, and a portion of the embodiment may be combined with a portion of another embodiment. A modified example will be described below.

Modified Example 1

In the first and second embodiments, the first operation rate of the first supply portion 201 and the second operation rate of the second supply portion 202 are operated with the same operation rate, but the present invention is not limited to this configuration. For example, the first operation rate and the second operation rate may be made different from each other. For example, in a case where the storage amount of waste paper Pu in the first supply portion 201 is larger than that in the second supply portion 202, by setting the operation rate of the first supply portion 201 higher than the operation rate of the second supply portion 202, occurrence of errors due to the absence of the waste paper Pu can be inhibited low. In addition, for example, the waste paper Pu or the like having high confidentiality is stored in the first supply portion 201, the waste paper Pu or the like with low confidentiality is stored in the second supply portion 202, and by increasing the operation rate of the first supply portion 201, documents with high confidentiality can be processed faster.

Modified Example 2

In the first and second embodiments, different raw materials may be stored and supplied in each supply portion 200. The different raw materials are, for example, waste papers Pu with different colors, waste papers Pu with different materials and the like. In addition, the different raw materials are raw materials having different fiber lengths of vegetable fibers or a structure containing the raw material, a raw material having different fiber diameters of vegetable fibers or a structure containing the raw material, fiber structures having different resin contents, and the like.

In this case, similar to Modified Example 2, the operation rates in the respective supply portions may be different. Different types of raw materials can be supplied at a predetermined mixing ratio by storing different types of raw materials in each supply portion and operating at an appropriate operation rate. In this manner, for example, a single sheet manufacturing apparatus 100 can produce seed sheets S having different textures and appearances.

Modified Example 3

The notification portion 400 in the first and second embodiments is disposed in the supply portion 200, but the configuration is not limited to this configuration. For example, the status of the supply portion 200 may be notified to a portable computer device such as a smartphone, a tablet terminal, a portable personal computer, or the like carried by the user. In this case, the control portion 104 is provided with a communication portion capable of communicating with various portable terminals, and may notify the user terminal device of the status of the supply portion 200 via a wired local area network (LAN), a wireless LAN, a portable telephone communication network, and the Internet by the communication portion. In this manner, even the user unable to directly view the raw material supply device 10 (sheet manufacturing apparatus 100) can grasp the status of the supply portion 200.

Modified Example 4

In the first and second embodiments, the setting of the operating condition (priority order and operation rate of the supply portion 200, switching timing, and the like) of the raw material supply device 10 is realized by software, and the configuration is not limited thereto.

For example, the setting may be configured to use hardware such as a dip switch. In addition, it may be configured so that the setting can be set only by the administrator (specific user), or it may be configured so that the setting can be set by a general user. In addition, in a case where there is no need to change the operating conditions, operating conditions may be set in advance in the raw material supply device 10 or the sheet manufacturing apparatus 100. Even in this case, the same effect as described above can be obtained.

Modified Example 5

In the second embodiment, the switching operation is performed by combining two supply portions of the three supply portions, but it is not limited to this configuration. Three supply portions (first supply portion 201, second supply portion 202, and third supply portion) may be operated simultaneously. In this case, for example, the operation rate of each supply portion is set to 33% and operated. Every time one sheet of waste paper Pu is supplied, the waste paper Pu is switched and supplied from the first supply portion 201 to the second supply portion 202, from the second supply portion 202 to the third supply portion, and from the third supply portion to the first supply portion 201. In a case where the first supply portion 201 is in a pause state, only the second supply portion 202 and the third supply portion are operated. At this time, the waste paper Pu is supplied at the operation rate of 50% of the second supply portion 202 and the third supply portion, respectively. In addition, for example, in a case where the first and second supply portions 201, 202 are in a pause state, only the third supply portion is operated. At this time, the operation rate of the third supply portion is set to 100%, and the waste paper Pu is supplied. As a result, it is possible to supply a certain amount of waste paper Pu without reducing the supply amount of the waste paper Pu.

Modified Example 6

In the second embodiment, one supply portion belongs to a plurality of sets, for example, the first supply portion 201 belongs to two sets of the first set and the third set, but it is not limited to this configuration. For example, in a case where there are four supply portions A to D, four supply portions may be divided into a set of supply portion A and supply portion B, and a set of supply portion C and supply portion D. That is, one supply portion may be combined so as to belong to only one set.

In addition, the combination is performed according to the priority of the supply portion, and the switching between sets is performed according to the priority, but it is not limited to this configuration. Any combination may be performed regardless of the priority and switching between sets may be performed in a predetermined set order regardless of the priority.

REFERENCE SIGNS LIST 10 raw material supply device
12 coarse crushing portion
20 defibrating portion
40 sorting portion
45 first web forming portion
50 mixing portion
60 accumulation portion
70 second web forming portion
80 sheet forming portion
90 cutting portion
100 sheet manufacturing apparatus
104 control portion
104a input and output portion
190 housing
200 supply portion
201 first supply portion
202 second supply portion
211 tray portion
221 movement mechanism
230 pickup roller
231 pair of transport rollers
233 guide portion
300 detection portion
301 first detection portion
302 second detection portion
310a light emitting portion
310b light receiving portion
400 notification portion 401 first notification portion
402 second notification portion

The invention claimed is:

1. A raw material supply device comprising:
a plurality of supply portions that supply a raw material;
a detection portion that detects a state of the supply portions; and
a control portion that controls the supply portions,
wherein when the plurality of supply portions are in an operation state, the control portion switches the supply portions at a predetermined timing, and causes each of the supply portions to supply the raw material,
upon the control portion determining that one supply portion of the supply portions is abnormal, the control portion causes the one supply portion to be in a pause state and causes a different supply portion of the supply portions to be in the operation state to supply the raw material, and
upon the control portion determining that abnormality of the one supply portion is eliminated, the control portion causes the one supply portion to shift from the pause state to a standby state in which the one supply portion waits without supplying the raw material, and causes the one supply portion to shift from the standby state to the operation state so as to switch the supply portions including the one and different supply portions and cause each of the supply portions to supply the raw material.

2. The raw material supply device according to claim 1, wherein the control portion controls the different supply portion so that a supply amount of the raw material per unit time when the plurality of supply portions are in the operation state and a supply amount of the raw material per unit time when the one supply portion of the supply portions is abnormal are the same as each other.

3. The raw material supply device according to claim 1, further comprising:
a notification portion that notifies the state of the plurality of supply portions.

4. The raw material supply device according to claim 1, wherein the control portion operates one of the one and different supply portions at a first operation rate and operates an other of the one and different supply portions at a second operation rate different from the first operation rate in the operation state.

5. The raw material supply device according to claim 4, further comprising:
a setting portion that sets the first and second operation rates.

6. The raw material supply device according to claim 1, wherein the supply portions include at least three or more supply portions that have the one supply portion and the different supply portion, and
the control portion selects at least two or more supply portions of the plurality of supply portions according to a preset priority, and causes each of the selected supply portions to supply the raw material.

7. A sheet manufacturing apparatus comprising:
the raw material supply device according to claim 1.

8. A raw material supply method of a raw material supply device including a plurality of supply portions for supplying a raw material, the method comprising:
switching the supply portions at a predetermined timing, and causing each of the supply portions to supply the raw material when the plurality of supply portions are in an operation state;
upon determining that one supply portion of the supply portions is abnormal, causing the one supply portion to be in a pause state and causing a different supply portion of the supply portions to be in the operation state to supply the raw material; and
upon determining that abnormality of the one supply portion is eliminated, causing the one supply portion to shift from the pause state to a standby state in which the one supply portion waits without supplying the raw material, and causing the one supply portion to shift from the standby state to the operation state so as to switch the supply portions including the one and different supply portions and cause each of the supply portions to supply the raw material.

* * * * *